US009751687B2

(12) United States Patent
Schwarz et al.

(10) Patent No.: US 9,751,687 B2
(45) Date of Patent: Sep. 5, 2017

(54) BREW BASKET AND FILTER PACK FOR ELECTRIC COFFEE BREWING MACHINE

(71) Applicant: Courtesy Products, L.L.C., St. Louis, MO (US)

(72) Inventors: Matthew Schwarz, Chesterfield, MO (US); Glenn Wells, St. Louis, MO (US)

(73) Assignee: Courtesy Products, L.L.C., St. Louis, MO (US)

( * ) Notice: Subject to any disclaimer, the term of this patent is extended or adjusted under 35 U.S.C. 154(b) by 407 days.

(21) Appl. No.: 14/522,332

(22) Filed: Oct. 23, 2014

(65) Prior Publication Data

US 2015/0114235 A1    Apr. 30, 2015

Related U.S. Application Data

(60) Provisional application No. 61/898,317, filed on Oct. 31, 2013.

(51) Int. Cl.
*B65D 85/804* (2006.01)
*A47J 31/057* (2006.01)
*A47J 31/06* (2006.01)

(52) U.S. Cl.
CPC ........ *B65D 85/8046* (2013.01); *A47J 31/057* (2013.01); *A47J 31/0642* (2013.01)

(58) Field of Classification Search
USPC ...... 99/279, 317, 323, 295; 426/77, 79, 106, 426/113, 115, 294, 392, 410, 433
See application file for complete search history.

(56) References Cited

U.S. PATENT DOCUMENTS 3,511,166 A * 5/1970 Bixby, Jr. ............. A47J 31/057
99/295
3,610,132 A  10/1971 Martin et al.
(Continued)

FOREIGN PATENT DOCUMENTS

DE    3644947 A1    4/1988
EP    0442061 A1    4/1994
(Continued)

OTHER PUBLICATIONS

Extended European Search Report for Corresponding EP Application No. 14857573.1 dated Nov. 16, 2016; 7 pages.

*Primary Examiner* — Anne M Antonucci
*Assistant Examiner* — Renee M Larose
(74) *Attorney, Agent, or Firm* — Dean D. Small; The Small Patent Law Group, LLC

(57) ABSTRACT

A brew basket is provided for use in a beverage brewing machine. The brew basket includes a body defining a brewing reservoir that extends along a longitudinal length from an open top to a bottom end having one or more openings. The brewing reservoir has an internally tapered multi-sided three-dimensional (3D) shape. The brewing reservoir having a first cross-sectional area at the open top that progressively narrows along the longitudinal length of the multi-sided 3D shape to a smaller second cross-sectional area proximate to the one or more openings at the bottom end. The open top is configured to receive heated water from the brewing machine during a brewing operation with brewed beverage discharging from the one or more openings. The multi-sided 3D shape of the brewing reservoir configured to receive a filter pack having a generally tapered multi-sided 3D shape similar to the multi-sided 3D shape of the brewing reservoir.

42 Claims, 17 Drawing Sheets

(56) References Cited

U.S. PATENT DOCUMENTS

| | | | |
|---|---|---|---|
| 3,620,155 A | 11/1971 | Bixby, Jr. | |
| 3,971,305 A * | 7/1976 | Daswick | B65D 85/8043 210/474 |
| 3,985,069 A * | 10/1976 | Cavalluzzi | A47J 31/02 426/77 |
| 4,382,861 A * | 5/1983 | Adeboi | A47J 31/02 210/497.2 |
| 5,552,164 A * | 9/1996 | Kuipers | B65D 85/812 206/0.5 |
| 5,605,710 A * | 2/1997 | Pridonoff | A47J 31/02 206/0.5 |
| 5,664,480 A * | 9/1997 | DiFilippo | A47J 31/0605 99/299 |
| 5,840,189 A * | 11/1998 | Sylvan | B65D 85/8043 210/233 |
| 6,589,577 B2 * | 7/2003 | Lazaris | B65D 85/8043 206/0.5 |
| 6,921,480 B2 * | 7/2005 | Post | A47J 31/08 210/238 |
| 7,021,198 B1 * | 4/2006 | Lyall, III | A47J 31/0642 426/77 |
| 2001/0000570 A1 * | 5/2001 | Aarts | A47J 31/002 99/295 |
| 2011/0005400 A1 * | 1/2011 | Tien | A47J 31/02 99/298 |

FOREIGN PATENT DOCUMENTS

| | | | |
|---|---|---|---|
| JP | 2013085639 A | 5/2013 | |
| JP | 2013188469 A | 9/2013 | |

* cited by examiner

| BREW PARAMETERS | P56-9 g IceMountain Mineral Water | P56-9 g IceMountain Mineral Water | P56-9 g IceMountain Mineral Water | P56-9 g IceMountain Mineral Water | P56-9 g IceMountain Mineral Water |
|---|---|---|---|---|---|
| Filter Position | 7.5 mm seal Seal Down | 7.5 mm seal Seal Down | 7.5 mm seal Seal Up | 8 mm seal Seal Down | 8 mm seal Seal Down |
| Filter Diameter (in) | Pyramid 3 1/8 x 3 1/8 | Pyramid 3 1/8 x 3 1/8 | Pyramid 3 1/8 x 3 1/8 | Pyramid 3 1/4 x 3 1/4 | Pyramid 3 1/4 x 3 1/4 |
| Paper Density (GSM) | 21 Glat | 21 Glat | 21 Glat | 21 Glat | 21 Glat |
| Net wt. (g) | 9 | 9 | 9 | 9 | 9 |
| Grind Size (u) | ~550 | ~550 | ~550 | ~550 | ~550 |
| Water In (oz) | 10 | 10 | 10 | 10 | 10 |
| Water Recovery (oz) | 9.75 | 9.5 | 9.5 | 9.25 | 9.25 |
| Brew Time (min) | 3.35 | 3.30 | 3.36 | 3.36 | 3.34 |
| Brew Temp (F) Stream | 187 | 188 | 186 | 188 | 187 |
| Cup | 176 | 178 | 179 | 175 | 177 |
| TDS (ppm) | 1149 | 1176 | 1177 | 1211 | 1019 |
| | 1158 | 1163 | 1168 | 1198 | 998 |
| | 1161 | 1167 | 1161 | 1191 | 1021 |
| Ave | 1156 | 1169 | 1169 | 1200 | 1013 |
| BB Hole Size (mm) | 3mm | 3mm | 3mm | 3mm | 3mm |
| Comments | Good sag Spout in Center | V. Good sag Spout in Center | V. Good sag Spout in Center | V. Good sag Spout in Center Water well penetrated filter | Spout in Center Some water spikes during brew. Filter swells, water overruns to sides |

FIG. 16

BREW BASKET AND FILTER PACK FOR ELECTRIC COFFEE BREWING MACHINE

RELATED APPLICATIONS

This is a non-provisional patent application of, and claims the benefit of, provisional Application Ser. No. 61/898,317, filed Oct. 31, 2013, entitled "BREW BASKET FILTER PACK FOR ELECTRIC COFFEE BREWING MACHINE", the complete subject matter of which is hereby expressly incorporated in its entirety.

BACKGROUND

The present invention relates generally to electric coffee brewing machines, and more particularly, to brew baskets and filter packs for electric coffee brewing machines.

For years, drip-type electric brewing machines have been used as an efficient means for brewing coffee. In general, these electric coffee brewing machines include a cold water reservoir, an electric resistance heating element for heating the water, and a reusable plastic brew basket for holding ground coffee in a paper coffee filter. To make coffee, cold water is poured into the water reservoir and coffee grounds are placed in a coffee filter, which is in turn placed in the brew basket. The cold water is heated by the electric heating element, and the heated water then saturates the coffee grounds. The brewed coffee then drips through the filter out of the brew basket, and into a receiving vessel, e.g., a coffee pot or coffee cup, which is positioned below the brew basket. After brewing is complete, the paper filter and used coffee grounds are taken out of the brew basket and discarded. Then, the brew basket and coffee pot are cleaned for re-use.

Known electric coffee brewing machines are not without disadvantages. For example, some of the heated water introduced into the brew basket may flow around the coffee filter and out of the brew basket without saturating the coffee grounds. In other words, some of the heated water may flow between the coffee filter and the brew basket instead of entering the coffee filter and saturating the coffee grounds, which may affect the quality of the brewed coffee. For example, the brewed coffee may be weaker and/or may be underdeveloped.

SUMMARY

In an embodiment, a brew basket is provided for use in a beverage brewing machine. The brew basket includes a body defining a brewing reservoir that extends along a longitudinal length from an open top to a bottom end having one or more openings. The brewing reservoir has an internally tapered multi-sided three-dimensional (3D) shape. The brewing reservoir having a first cross-sectional area at the open top that progressively narrows along the longitudinal length of the multi-sided 3D shape to a smaller second cross-sectional area proximate to the one or more openings at the bottom end. The open top is configured to receive heated water from the brewing machine during a brewing operation with brewed beverage discharging from the one or more openings. The multi-sided 3D shape of the brewing reservoir configured to receive a filter pack having a generally tapered multi-sided 3D shape similar to the multi-sided 3D shape of the brewing reservoir.

In an embodiment, a filter pack is provided for use in a beverage brewing machine having a brew basket that includes a brewing reservoir. The filter pack includes a liquid permeable pouch containing coffee grounds. The pouch has multiple sides and multiple vertices joined to form a generally tapered multi-sided three-dimensional (3D) shape that encloses the coffee grounds. The pouch is configured to be held within the brewing reservoir of the brew basket. The multi-sided 3D shape and size of the pouch is substantially similar to and complementary with the multi-sided 3D shape and size of the brewing reservoir. The sides and vertices of the pouch form a polygon that fits within the brewing reservoir when oriented in any of at least two inverted positions. A different associated one of the vertices is located proximate to a bottom end of the brew basket when in each of the associated inverted positions. The pouch is configured to receive heated water from the brewing machine at an uppermost one of the sides during a brewing operation with brewed beverage discharging from the inverted vertex.

In an embodiment, a brew basket is provided for use in a beverage brewing machine. The brew basket includes a body defining a brewing reservoir having an open top and a bottom end having one or more openings. The brewing reservoir has a longitudinal height that extends from the open top to the one or more openings at the bottom end. The brewing reservoir has a width at the open top. The open top is configured to receive heated water from the brewing machine during a brewing operation, the bottom end being configured to discharge brewed beverage from the one or more openings. The brewing reservoir is shaped with the longitudinal height being at least as great as the width such that the heated water flows through coffee grounds until accumulating at least a select amount of solids per unit of heated water before discharging from the one or more openings at the bottom end.

In an embodiment, a brew basket is provided for use in a beverage brewing machine. The brew basket includes a body defining a brewing reservoir having an open top and a bottom end having one or more openings. The open top is configured to receive heated water from the brewing machine during a brewing operation. The bottom end is configured to discharge brewed beverage from the one or more openings. The brewing reservoir has a grounds retention segment proximate to the bottom end. The grounds retention segment has a volume configured to hold coffee grounds in an enclosed filter pack. The coffee grounds enclosed in the filter pack contain a predetermined total available solids. The brewing reservoir is configured such that the heated water flows through the coffee grounds until accumulating at least 14% of the predetermined total available solids available within the coffee grounds before discharging from the one or more openings at the bottom end.

In an embodiment, a filter pack is provided for use in a beverage brewing machine having a brew basket that includes a brewing reservoir. The filter pack includes a liquid permeable pouch containing coffee grounds. The pouch has multiple sides and multiple vertices joined to form a generally tapered multi-sided three-dimensional (3D) shape that encloses the coffee grounds. The pouch is configured to be held within the brewing reservoir of the brew basket, the multi-sided 3D shape and size of the pouch being substantially similar to and complementary with the multi-sided 3D shape and size of the brewing reservoir. The multi-sided 3D shape of the pouch has funnel-shaped segments proximate each of the vertices such that coffee grounds fill any one of the funnel-shaped segments when the filter pack is oriented with the associated vertex at a bottom end of the brewing reservoir. The pouch is configured to receive heated water from the brewing machine at an uppermost one of the sides during a brewing operation with brewed beverage discharging from the associated vertex at the bottom end of the brewing machine.

In an embodiment, a brew basket and filter pack assembly is provided for use in a beverage brewing machine. The assembly includes a brew basket having a body defining a brewing reservoir that extends along a longitudinal length from an open top to a bottom end having one or more openings. The brewing reservoir has an internally tapered multi-sided three-dimensional (3D) shape. The brewing reservoir has a first cross-sectional area at the open top that progressively narrows along the longitudinal length of the multi-sided 3D shape to a smaller second cross-sectional area proximate to the one or more openings at the bottom end. The open top is configured to receive heated water from the brewing machine during a brewing operation with brewed beverage discharging from the one or more openings. The assembly includes a filter pack having a liquid permeable pouch containing coffee grounds. The pouch has multiple sides and multiple vertices joined to form a generally tapered multi-sided three-dimensional (3D) shape that encloses the coffee grounds. The pouch is configured to be held within the brewing reservoir of the brew basket. The multi-sided 3D shape and size of the filter pack is substantially similar to and complementary with the multi-sided 3D shape and size of the brewing reservoir.

BRIEF DESCRIPTION OF THE DRAWINGS

FIG. 16 is a table illustrating experimental results of brewing coffee using the assembly of the brew basket and the filter pack shown in FIGS. 10-15.

DETAILED DESCRIPTION

Figure 1:
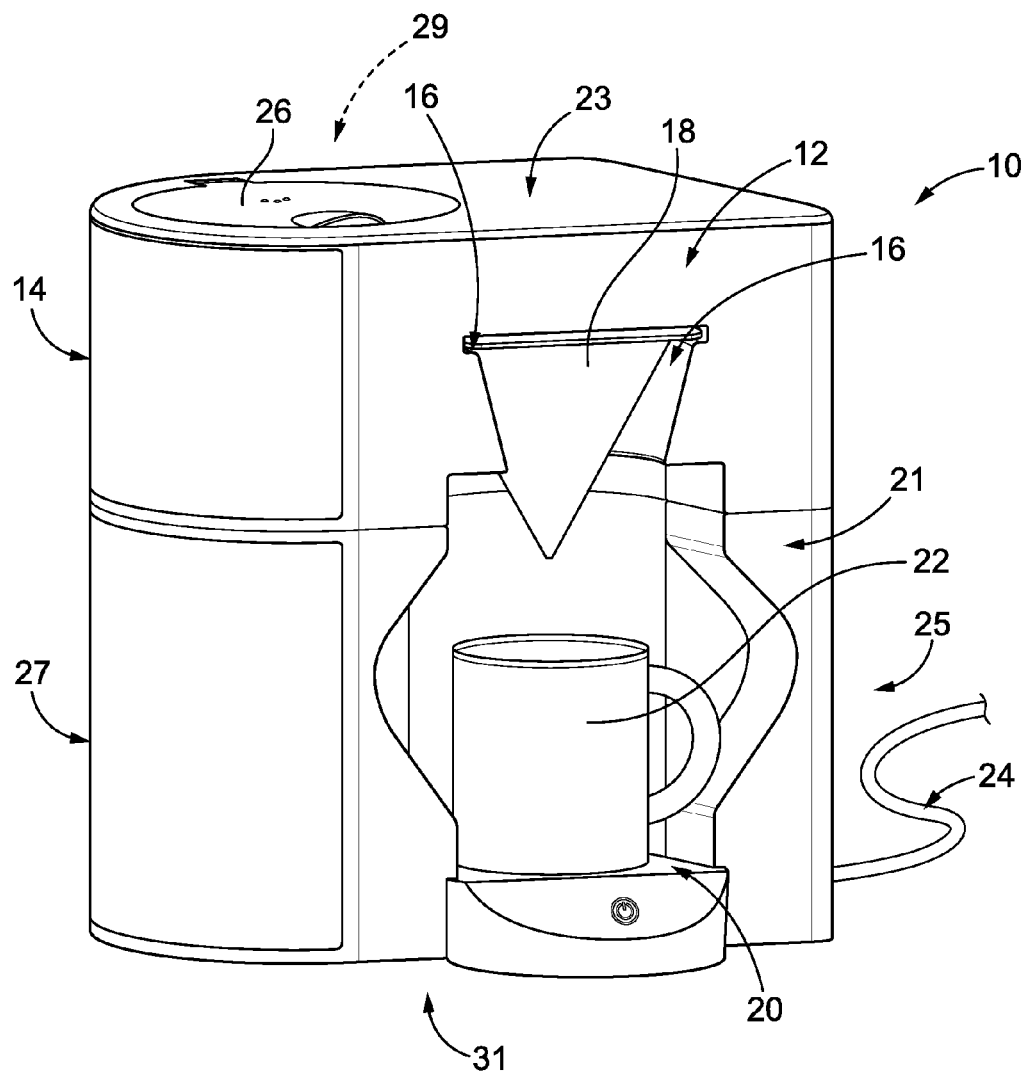
FIG. 1 is a perspective view of an embodiment of an electric coffee brewing machine.
Figure 2:
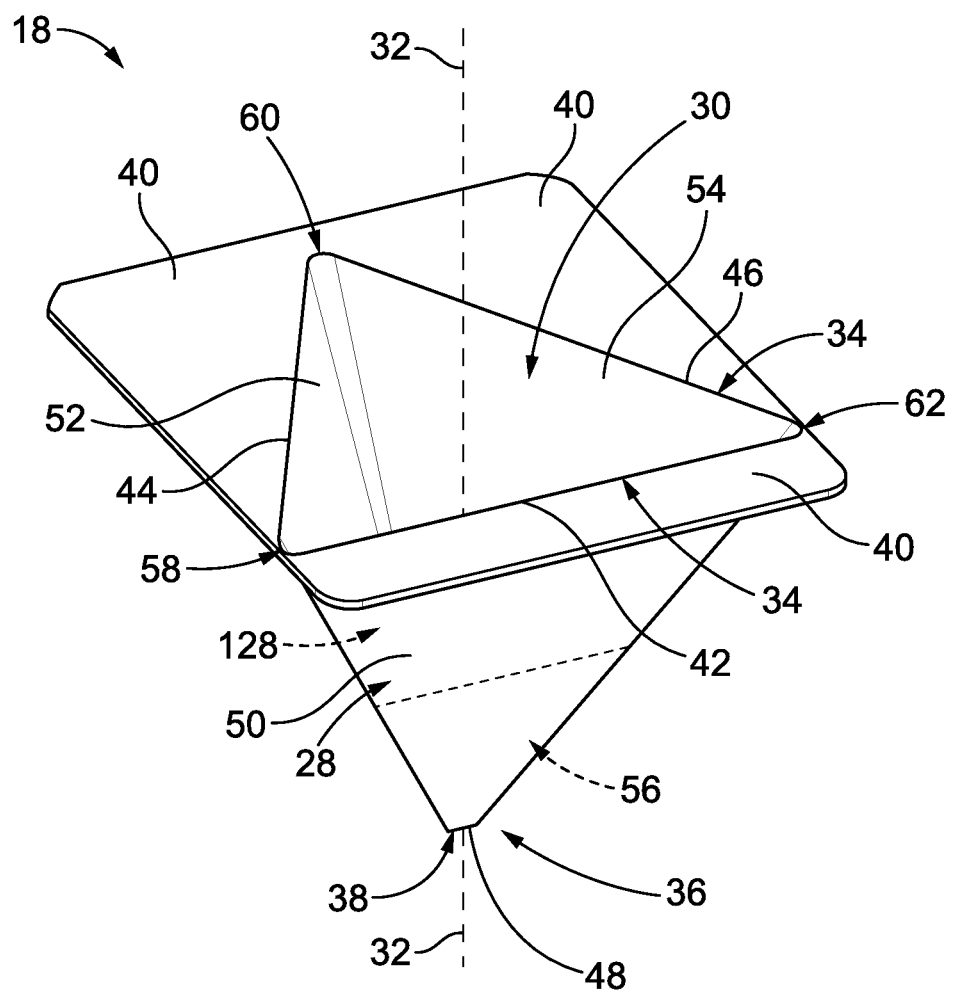
FIG. 2 is a perspective view of an embodiment of a brew basket.

FIG. 1 is a perspective view of an embodiment of a drip-type electric coffee brewing machine 10. The machine 10 includes an outer housing 12, a cold water reservoir 14, and a basket-receiving recess 16. The machine 10 also includes a brew basket 18, a receiving vessel platform 20 for supporting a coffee-receiving vessel 22 (e.g., a coffee pot, coffee cup, and/or the like), and an electric power cord 24. The outer housing 12 may include any suitable material(s) that enables the housing 12 to function as described and/or illustrated herein, such as, but not limited to, plastic, metal, and/or the like. In some respects, the electric coffee brewing machine 10 is similar to conventional drip-type electric coffee brewing machines. To make coffee, a lid 26 to the cold water reservoir 14 is lifted and cold water (not shown) is poured into the reservoir 14. A filter pack (not shown in FIG. 1, e.g., the filter pack 66 shown in FIGS. 6-15, etc.) containing coffee grounds (not shown in FIG. 1, e.g., the coffee grounds 110 shown in FIGS. 11, 12, 14, and 15) is placed in the brew basket 18. The cold water is heated by an electric heating element (not shown) housed in the machine 10. The heated water then flows into the brew basket 18 and saturates the coffee grounds contained therein. Brewed coffee then drips out into the receiving vessel 22, which is positioned on the receiving vessel platform 20 immediately below the brew basket 18.

As used herein, "coffee grounds" includes soluable (i.e., instant) coffee grounds and non-soluable (i.e., non-instant) coffee grounds. In other words, the brew baskets, filter packs, and filters described and/or illustrated herein may be selectively used with both soluable coffee grounds and/or non-soluable coffee grounds. Non-soluable coffee grounds are commonly referred to as "ground and roasted coffee". Soluable coffee grounds may be rendered soluable using various methods, such as, but not limited to, freeze drying, spray drying, and/or the like. As used herein, "brewed coffee" includes coffee that has been brewed using soluable coffee grounds and/or non-soluable coffee grounds. In other words, making coffee using soluable coffee grounds with the brew baskets, filter packs, and/or filters described and/or illustrated herein is considered "brewing" the coffee. In some embodiments, the brewing machine 10 is used to make hot water without brewing any coffee. For example, the brew baskets described and/or illustrated herein may be used within the brewing machines described and/or illustrated herein without containing coffee grounds (e.g., contained in a filter pack, loose, and/or the like) to deposit heated water into the coffee-receiving vessel 22 without brewing any coffee.

In the illustrated embodiment, the brewing machine 10 represents a style that is commonly referred to as a "front loading" machine wherein the brew basket 18 is loaded into the basket-receiving recess 16 from a front 21 of the machine 10. But, alternatively the brewing machine 10 may represent any other type, such as, but not limited to, a "top loading" machine wherein the brew basket 18 is loaded into the basket-receiving recess 16 from a top 23 of the machine 10. In other embodiments, the brewing machine 10 may represent a "side loading" machine wherein the brew basket 18 is loaded into the basket-receiving recess 16 from a side 25 and/or a side 27 of the machine 10. In still other embodiments, the brewing machine 10 may represent a "rear loading" machine wherein the brew basket 18 is loaded into the basket-receiving recess 16 from a rear 29 of the machine 10, or a "bottom loading" machine wherein the brew basket 18 is loaded into the basket-receiving recess 16 from a bottom 31 of the machine 10. The coffee-receiving vessel 22 may be referred to herein as a "beverage container".

FIGS. 2-5 illustrate an embodiment of the brew basket 18. The brew basket 18 is shaped and dimensioned to fit within the basket-receiving recess 16 (FIG. 1) of the electric coffee brewing machine 10 (FIG. 1). The brew basket 18 includes a body 28 that defines a brewing reservoir 30 for holding a filter pack 66 (FIGS. 6-15) during a brewing operation. The body 28 includes an internally tapered multi-sided three-dimensional (3D) shape that extends a height along a central longitudinal axis 32 from an open top 34 (not visible in FIG. 5) to a bottom end 36. The brewing reservoir 30 also includes an internally tapered multi-sided 3D shape that extends a height H (not labeled in FIGS. 2, 3, and 5) along the central longitudinal axis 32 from the open top 34 to the bottom end 36. The open top 34 defines an open top of the brewing reservoir 30 and the bottom end 36 defines a bottom end of the brewing reservoir 30. In the illustrated embodiment, the value of the height of the body 28 is approximately equal to the height H of the brewing reservoir 30, but in other embodiments the value of the height H of the brewing reservoir 30 is different than the value of the height of the body 28. The height H of the brewing reservoir 30 may be considered and referred to herein as a "longitudinal length" and/or a "longitudinal height" of the brewing reservoir 30.

Figure 11:
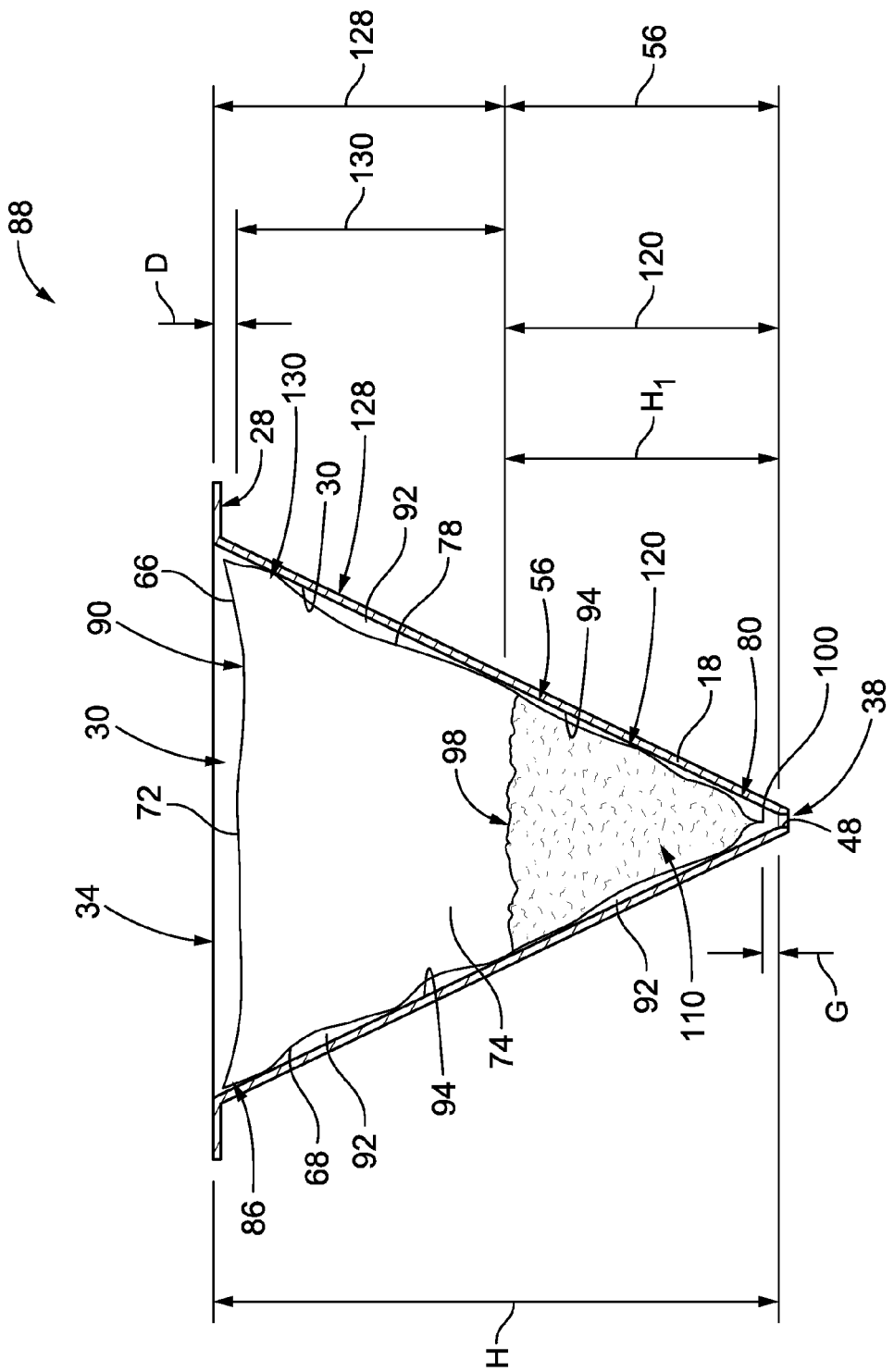
FIG. 11 is a cross-sectional view of the assembly shown in FIG. 10 taken along line 11-11 of FIG. 10.

The open top 34 is open to the brewing reservoir 30 (e.g., defines an open end of the reservoir 30) and is configured to receive heated water from the brewing machine 10. The heated water flows through the open top 34 and into the brewing reservoir 30 during the brewing operation. The bottom end 36 includes one or more openings 38 that extend through the body 28 to permit brewed coffee to flow from the brewing reservoir 30 of the brew basket 18 into the coffee-receiving vessel 22 (FIG. 1). As best seen in FIG. 11, in the illustrated embodiment, the height H of the brewing reservoir 30 extends along the central longitudinal axis 32 from the open top 34 to the openings(s) 38 at the bottom end 36. The opening(s) 38 may be commonly referred to as a "drip spout".

Referring again to FIGS. 2-5, the brew basket 18 optionally includes a lip 40 that extends radially outward (relative to the central longitudinal axis 32) at the open top 34. The lip 40 may facilitate supporting the brew basket 18 within the basket-receiving recess 16 (FIG. 1) of the brewing machine 10. The lip 40 may facilitate grasping the brew basket 18 for generally holding the brew basket 18, for inserting the brew basket 18 within the basket-receiving recess 16, and/or for removing the brew basket 18 from the basket-receiving recess 16. Alternatively, the brew basket 18 does not include the lip 40 or the lip 40 includes a different size, shape, geometry, orientation, location, position, and/or the like.

Figure 3:
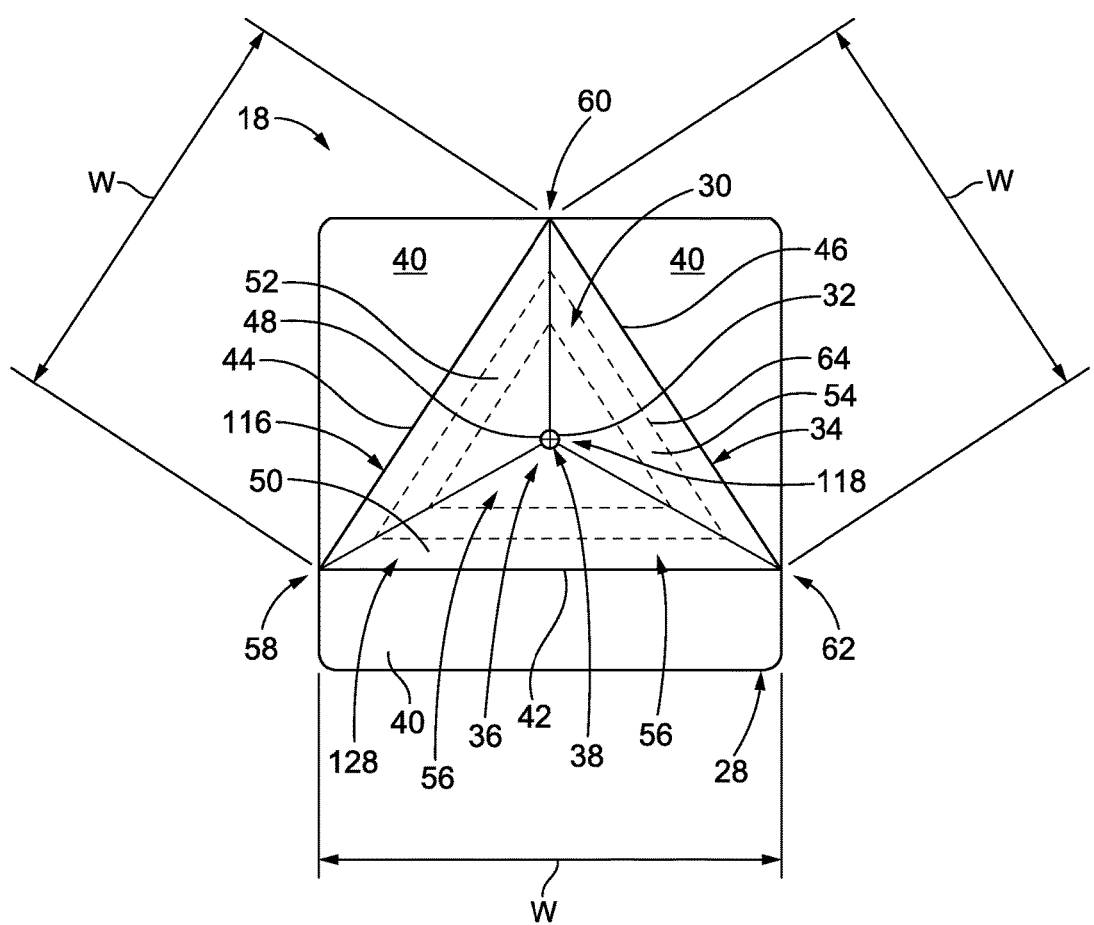
FIG. 3 is a plan view of the brew basket shown in FIG. 2.

Referring now solely to FIG. 3, the brewing reservoir 30 has a width W at the open top 34 that is defined by the maximum width dimension of the open top 34. In the illustrated embodiment, the open top 34 is bounded by three side edges 42, 44, and 46. The width W of the illustrated embodiment of the open top 34 is defined by the length of each of the side edges 42, 44, and 46. In other words, each of the side edges 42, 44, and 46 defines a different location of the maximum width dimension of the open top 34. In the illustrated embodiment, the open top 34 generally has a triangular shape, and specifically has the shape of an equilateral triangle. But, the open top 34 may have any other shape having any other number of side edges greater than one (i.e., a multi-sided shape), such as, but not limited to, other triangular shapes, a shape having only two side edges, a rectangular shape, a square shape, an octagonal shape, a shape having at least four side edges, a shape having at least five side edges, and/or the like.

The bottom end 36 of the brewing reservoir 30 may include any number of the openings 38. In the illustrated embodiment, the bottom end 36 of the brewing reservoir 30 includes a single opening 38. As shown in FIG. 3, the opening 38 has a circular shape in the illustrated embodiment. The illustrated embodiment of the opening 38 is thus bounded by a single side edge 48. But, the opening 38 may have any other shape having any other number of side edges, such as, but not limited to, a triangular shape, an oval shape, a rectangular shape, a square shape, an octagonal shape, a shape having at least four side edges, a shape having at least five side edges, and/or the like. The size, shape, and/or number of the opening(s) 38 may be selected to provide a predetermined ratio of the output rate of liquid from the opening(s) 38 as compared to the input rate of heated water into the brewing reservoir 30.

Referring again to FIGS. 2-5, the multi-sided 3D shape of the brewing reservoir 30 provides the brewing reservoir 30 with a volume that is defined between sidewalls 50, 52, and 54 of the body 28 from the side edges 42, 44, and 46 (not visible in FIGS. 4 and 5) of the open top 34 to the side edge 48 of the opening 38 of the bottom end 36. As briefly discussed above, the multi-sided 3D shape of the brewing reservoir 30 is internally tapered. Specifically, the brewing reservoir 30 has a first cross-sectional area 116 (not labeled in FIGS. 2, 4, and 5) at the open top 34 that progressively narrows along the height H of the multi-sided 3D shape of the brewing reservoir 30 to a smaller second cross-sectional area 118 (not labeled in FIGS. 2, 4, and 5) that is proximate to the one or more openings 38 at the bottom end 36.

Optionally, the multi-sided 3D shape of the brewing reservoir 30 is continuously tapered from the open top 34 to the opening 38 at the bottom end 36 of the brewing reservoir 30 to continuously channel heated water through the coffee grounds 110 (FIGS. 6-15) enclosed in the filter pack 66 to the opening 38 at the bottom end 36. Specifically, the illustrated embodiment of the brewing reservoir 30 includes three sidewalls 50, 52, and 54. Each of the sidewalls 50, 52, and 54 extends a length from the open top 34 to the bottom end 36. Specifically, each sidewall 50, 52, and 54 extends the length from a respective side edge 42, 44, and 46 of the open top 34 to the side edge 48 of the opening 38 of the bottom end 36. In the illustrated embodiment, each sidewall 50, 52, and 54 is continuously tapered from the respective side edge 42, 44, and 46 of the open top 34 to the side edge 48 of the opening 38. In other words, and as best seen in FIG. 4, the length of each sidewall 50, 52, and 54 is continuously angled relative to the central longitudinal axis 32 such that the sidewall 50, 52, and 54 extends toward the central longitudinal axis 32 as the length of the sidewall 50, 52, and 54 extends toward the opening 38, whether or not the value of the angle is substantially even (i.e., consistent) along the length of the sidewall 50, 52, and/or 54.

Figure 4:
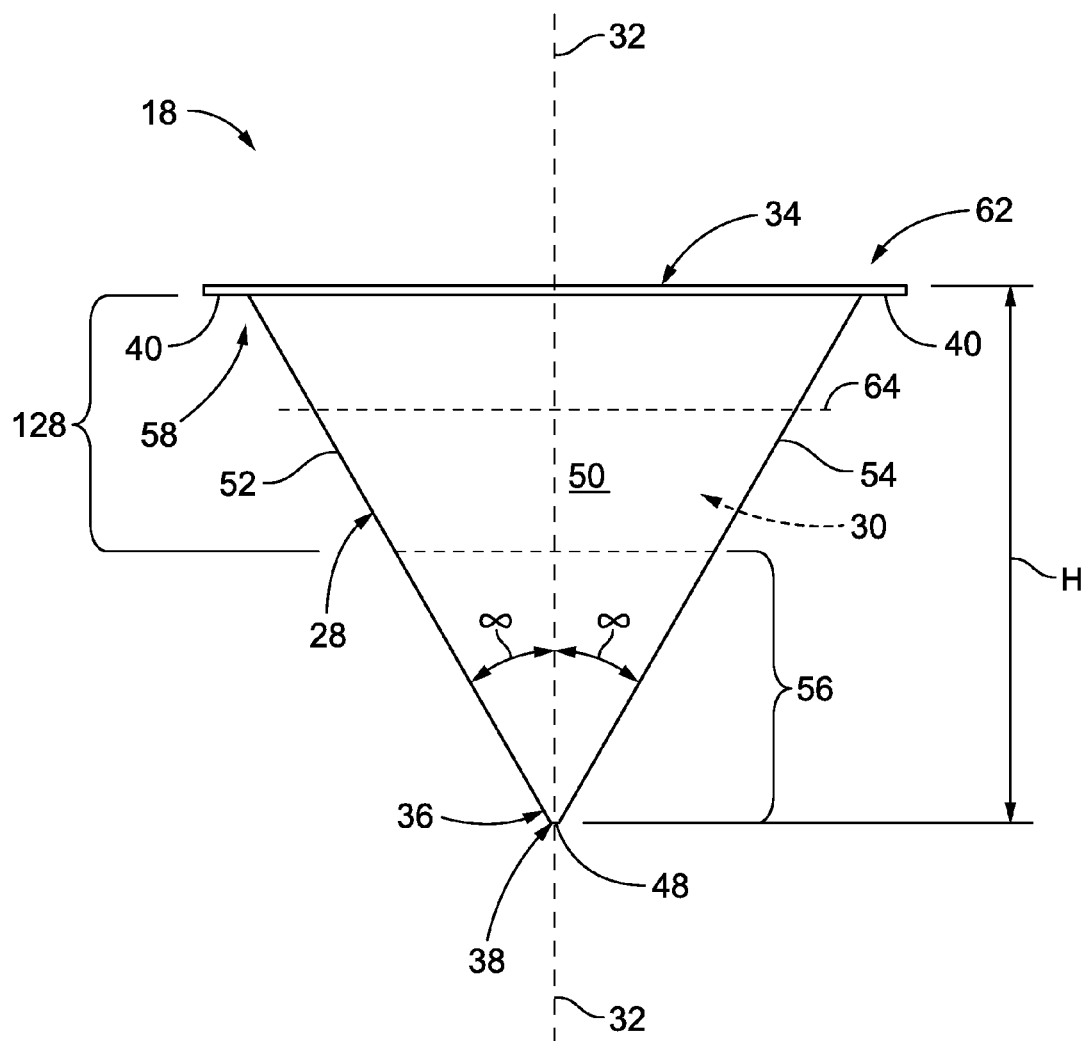
FIG. 4 is an elevational view of the brew basket shown in FIGS. 2 and 3.
Figure 5:
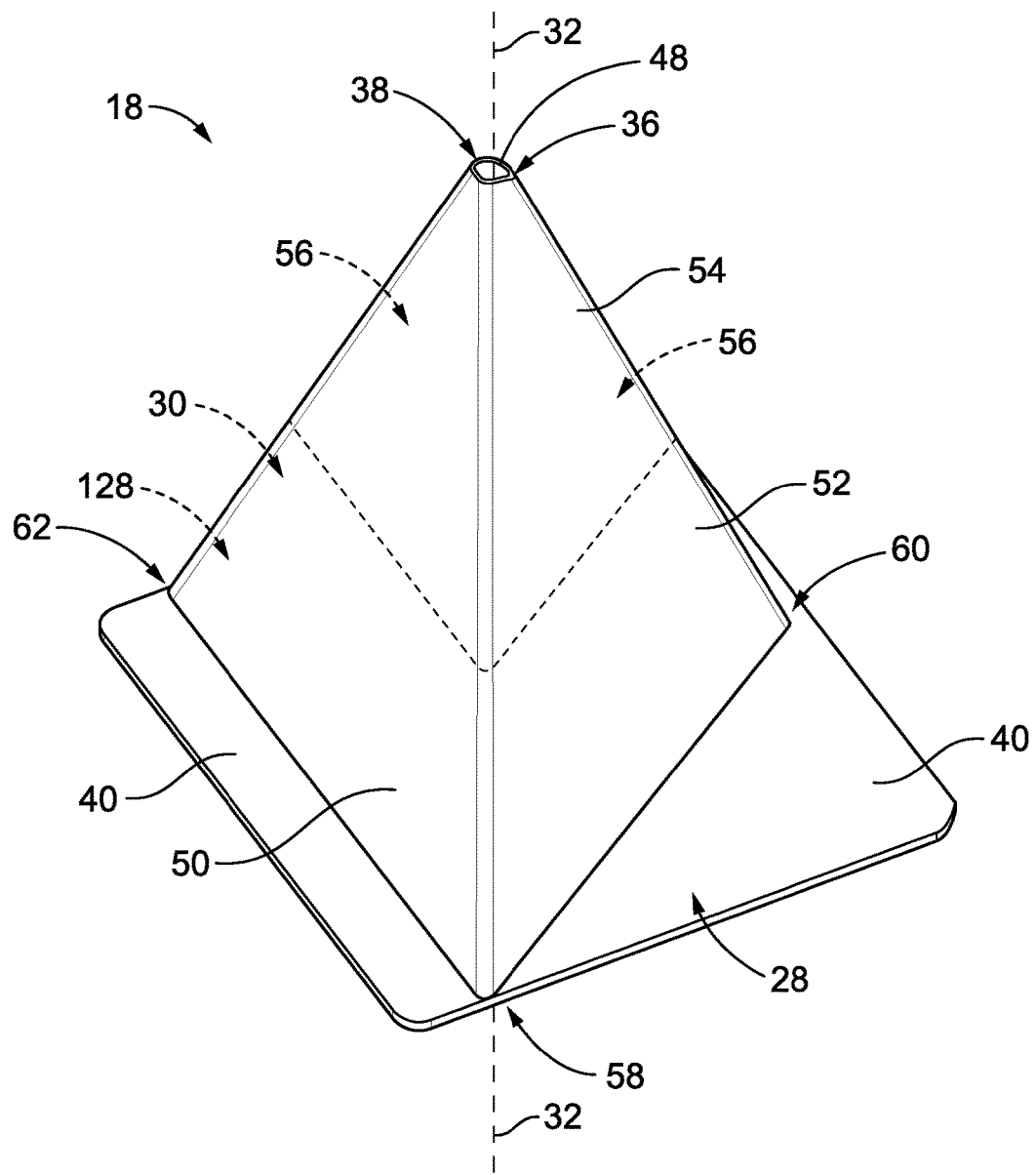
FIG. 5 is another perspective view of the brew basket shown in FIGS. 2-4 illustrating the brew basket from a different orientation than FIG. 2.
Figure 6:
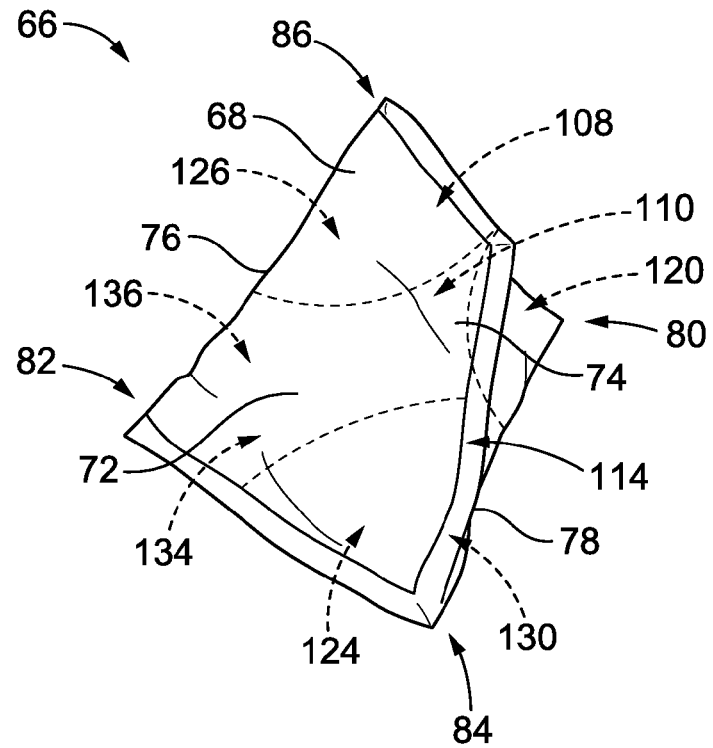
FIG. 6 is a perspective view of an embodiment of a filter pack for use with the brew basket shown in FIGS. 2-5.

As best seen in FIG. 4, the amount of taper or pitch (relative to vertical) of the body 28 is optionally substantially even from the open top 34 to the opening 38 of the bottom end 36. Specifically, the amount of taper of each sidewall 50, 52, and 54 may be substantially even from the respective side edge 42, 44, and 46 to the side edge 48 of the opening 38. In other words, each sidewall 50, 52, and 54 has the same angle or pitch relative to the central longitudinal axis 32 along the entirety of the length of the sidewall 50, 52, and 54 from the respective side edge 42, 44, and 46 to the side edge 48 of the opening 38. The angle ∞ or pitch may be varied in different embodiments based on various considerations, including an extent to which the pitch affects a total dissolved solids (TDS) extracted from the coffee grounds resulting in a desired amount of brewed beverage. For example, as shown in FIG. 4 with respect to the sidewalls 52 and 54, the lengths of the sidewalls 52 and 54 extend at an angle ∞ relative to the central longitudinal axis 32. As one example, the entire length of each of the sidewalls 52 or 54 extends at the approximately the same angle ∞ relative to the central longitudinal axis 32. For example, there are no segments of the lengths of the sidewalls 52 or 54 that extend approximately perpendicular relative to the central longitudinal axis 32. For example, there are no segments of the lengths of the sidewalls 52 or 54 that both intersect the side edge 48 of the opening 38 and extend approximately perpendicular relative to the central longitudinal axis 32. In other embodiments, the amount of taper in the body 28 is un-even from the open top 34 to the opening 38 of the bottom end 36. For example, the body 28 may have a stepped structure along the height from the open top 34 to the opening 38 of the bottom end 36. Moreover, and for example, the sidewalls 50, 52, and/or 54 of the body 28 may include two or more segments that extend along the height of the body 28 between the open top 34 and the opening 38 and have different angles relative to the central longitudinal axis 32 as compared to each other. TDS may sometimes be referred to as "brewed solids".

Optionally, the body 28 may be formed with a one-piece unitary construction (i.e., a monolithic construction), such as, but not limited to, from injection molding, extrusion, and/or the like. Optionally, the body 28 may have a multi-piece construction that is collapsible and expandable, where the pieces form a water tight seal with one another when expanded. In embodiments wherein the body 28 is formed with a one-piece unitary construction, the one-piece unitary construction may be rigid or may be collapsible and expandable.

The continuous taper of the body 28 of the brew basket 18 from the open top 34 to the opening 38 of the of the bottom end 36 defines a funnel that continuously channels heated water through the coffee grounds 110 enclosed in the filter pack 66 and out through the opening 38, such that brewed coffee flows from the brewing reservoir 30 into the coffee-receiving vessel 22. For example, the bottom end 36 of the brewing reservoir 30 includes a funnel-shaped segment 56 proximate to the opening 38 to channel the heated water through the coffee grounds 110 in the filter pack 66 before exiting through the opening 38 to facilitate extraction. As will be described below, the brewing reservoir 30 is configured to receive the filter pack 66 therein such that a funnel-shaped segment (e.g., any one of the funnel-shaped segments 120, 122, 124, or 126) of the filter pack 66 substantially fills the funnel-shaped segment 56 of the brewing reservoir 30 to facilitate extraction. The funnel-shaped segment 56 of the brewing reservoir 30 defines a grounds retention segment of the brewing reservoir 30 that extends proximate to the bottom end 36. The funnel-shaped segment 56 has a volume that is configured to hold the coffee grounds 110 enclosed in the filter pack 66. The brewing reservoir 30 has a head segment 128 that is proximate to the open top 34. As will be described below, the head segment 128 is configured to hold a head space (e.g., any one of the head spaces 130, 132, 134, and 136) of the filter pack 66 that extends between the coffee grounds 110 and a closed top 90 of the filter pack 66.

The operation and advantages of the internally tapered multi-sided 3D shape of the brewing reservoir 30 will be described in more detail below. The multi-sided 3D shape of the brewing reservoir 30 may be continuously tapered by any amount of taper. For example, the lengths of the sidewalls 50, 52, and 54 may have any angle ∞ relative to the central longitudinal axis 32. Moreover, the body 28 may have any height H, the open top 34 may have any width W, the brewing reservoir 30 may have any volume, the funnel-shaped segment 56 may have any volume, and the head segment 128 may have any volume.

Selection of the amount of taper (e.g., the angle ∞ or pitch of the side walls 50, 52, and/or 54), the height H, the width W, the volume of the brewing reservoir 30, the volume of the funnel-shaped segment 56, the volume of the head segment 128, other parameters of the multi-sided 3D shape of the brewing reservoir 30, and/or any relations therebetween may be based on the operation of the multi-sided 3D funnel shape of the brewing reservoir 30 and/or may be selected to: (1) increase the turbulence of heated water moving through the brewing reservoir 30, for example as described below; (2) create a seal between the filter pack 66 and the body 28 of the brew basket 18, for example as described below; (3) prevent or reduce the amount of heated water that flows around the filter pack 66 and through the opening 38 without saturating the coffee grounds 110, for example as described below; (4) increase the amount of heated water that saturates the coffee grounds 110, for example as described below; and/or (5) affect the quality of the brewed coffee. For example, affecting the quality of the coffee may include increasing the strength of the brewed coffee (e.g., the amount of total dissolved solids (TDS) per unit of heated water within the brewed coffee) and/or may include increasing the extraction yield (i.e., the amount of coffee ground soluables that have moved from the filter pack 66 to the brewed coffee) of the brewed coffee.

The ratio of the height H of the brewing reservoir 30 as compared to the width W of the open top 34 may be selected to: (1) increase the turbulence of heated water moving through the brewing reservoir 30; (2) create a seal between the filter pack 66 and the body 28 of the brew basket 18; (3) prevent or reduce the amount of heated water that flows around the filter pack 66 and through the opening 38 without saturating the coffee grounds 110; (4) increase the amount of heated water that saturates the coffee grounds 110; and/or (5) affect the quality of the brewed coffee. The height H of the brewing reservoir 30 may have any value as compared to the width W of the open top 34. For example, in the some embodiments the multi-sided 3D shape of the brewing reservoir 30 has a ratio of the height H of the brewing reservoir 30 to the width W of the open top 34 of approximately 1 to 1, such that the heated water flows though the coffee grounds 110 until accumulating a select amount of solids per unit of heated water before discharging through the opening 38 at the bottom end 36. In other embodiments, and for example, the height H of the brewing reservoir 30 is greater than the width W of the open top 34. As one example, the ratio of the height H of the brewing reservoir 30 to the width W of the open top 34 may be 4 to 3, such that for four units of height H, the open top 34 has a width W of no more than three units. As another example, the ratio of the height H of the brewing reservoir 30 to the width W of the open top 34 may be 2 to 1, such that for two units of height H, the open top 34 has a width W of no more than one unit.

The ratio of the height H of the brewing reservoir 30 as compared to the volume of the funnel-shaped segment 56 may be selected to: (1) increase the turbulence of heated water moving through the brewing reservoir 30; (2) create a seal between the filter pack 66 and the body 28 of the brew basket 18; (3) prevent or reduce the amount of heated water that flows around the filter pack 66 and through the opening 38 without saturating the coffee grounds 110; (4) increase the amount of heated water that saturates the coffee grounds 110; and/or (5) affect the quality of the brewed coffee. The height H of the brewing reservoir 30 may have any value as compared to the volume of the funnel-shaped segment 56. For example, in some embodiments the multi-sided 3D shape of the brewing reservoir 30 has a ratio of the height H of the brewing reservoir 30 to the volume of the funnel-shaped segment 56 of at least 1/5 (i.e., 20%), such that the heated water flows though the coffee grounds 110 until accumulating a select amount of solids per unit of heated water before discharging through the opening 38 at the bottom end 36. Other non-limiting examples of the ratio of the height H of the brewing reservoir 30 to the volume of the funnel-shaped segment 56 include, but are not limited to, between approximately 1/5 (i.e., 20%) and approximately 3/1 (i.e., 300%), at least approximately 2/1 (i.e., 200%), or at least approximately 3/1 (i.e., 300%).

In the illustrated embodiment, the multi-sided 3D shape of the brewing reservoir 30 constitutes an open-sided tetrahedral shape, and more specifically a triangular pyramid. Specifically, the sidewalls 50, 52, and 54 and the open top 34 define the shape of a triangular pyramid, where each of the sidewalls 50, 52, and 54 and the open top 34 defines a different side of the triangular pyramid. In other words, the brewing reservoir 30 has the shape of a triangular pyramid with three closed sides (i.e., the sidewalls 50, 52, and 54) and an open side (i.e., the open top 34). The opening 38 of the bottom end 36 defines one of the vertices of the triangular pyramid shape. The intersections between the side edges 42 and 44, between the side edges 44 and 46, and between the side edges 46 and 42 define respective vertices 58, 60, and 62 of the triangular pyramid shape. As is inherent for a triangular pyramid shape and best seen in FIG. 3, the multi-sided 3D shape of the body 28 includes a triangular cross-sectional shape taken along a plane 64 (better seen in FIG. 4) that extends approximately perpendicular to the central longitudinal axis 32. The lip 40 of the body 28 extends radially (relative to the central longitudinal axis 32) outward from the side edges 42, 44, and 46 of the open top 34 of the triangular pyramid shape. A triangular pyramid shape is also sometimes referred to as a "regular tetrahedron".

The multi-sided 3D shape of the brewing reservoir 30 is not limited to the triangular pyramid shape of the illustrated embodiment of the brew basket 18, but rather may additionally or alternatively include any other shape. In other words, in addition or alternatively to the triangular pyramid shape, the multi-sided 3D shape of the brewing reservoir 30 may include any other shape that is defined by any number of sidewalls greater than one, such as, but not limited to, a cross-sectional shape defined by two side edges (i.e., a shape defined by two sidewalls), a different triangular cross-sectional shape, a different tetrahedral shape, a rectangular cross-sectional shape (i.e., a shape defined by four sidewalls), a square cross-sectional shape (i.e., a shape defined by four equilateral sidewalls), an octagonal cross-sectional shape (i.e., a shape defined by five sidewalls), a shape defined by at least four sidewalls, a shape defined by at least five sidewalls, and/or the like. Various non-limiting examples of other 3D funnel shapes of the brew basket body 28 and the brewing reservoir 30 are described below with reference to FIGS. 17 and 18.

The brewing reservoir 30 of the brew basket 18 may have a size (i.e., the volume) dimensioned appropriate to make approximately only a single serving of coffee during a single brewing operation. Alternatively, the brewing reservoir 30 has a size dimensioned appropriate to make more than one serving of coffee during a single brewing operation. The size of the brewing reservoir 30 may be dimensioned to make any number of servings of coffee during a brewing operation.

The brew basket 18 is optionally disposable. By "disposable", it is meant that the brew basket 18 is only for a limited number of brewing operations before being discarded, whether or not each brewing operation brews a single serving of coffee or more than one serving of coffee. In other words, the brew basket 18 is "disposable" when the brew basket 18 is discarded after being used for a limited number of brewing operations. In some embodiments, a disposable brew basket 18 is used for only a single brewing operation before being discarded, whether or not the single brewing operation brews a single serving of coffee or more than one serving of coffee. The limited number of brewing operations that a disposable brew basket 18 is used for may be any number of brewing operations performed over any time period that is less than a normal expected lifetime of the brewing machine 10, such as, but not limited to, a day, a week, a month, and/or the like. In some embodiments, the limited number of brewing operations that a disposable brew basket 18 is used for coincides with the time period of a stay of a guest (or group of guests using the same brewing machine 10) in a hotel, motel, and/or other lodging establishment. In other words, a disposable brew basket 18 may be used by a guest for one or more brewing operations during a stay of the guest at a hotel, motel, and/or other lodging establishment (e.g., a friend or acquaintances home and/or the like) before being discarded when the guest's stay is complete. In other embodiments, the brew basket 18 is not disposable, but rather is used for more than a limited number of brewing operations, for example a non-disposable brew basket 18 may be used from the lifetime of the brewing machine 10. A "disposable" brew basket 18 may or may not be dishwasher safe. A "disposable" brew basket 18 may or may not be recyclable, compostable, and/or biodegradable.

The various components of the body 28 of the brew basket 18 (e.g., the sidewalls 50, 52, and 54 and the lip 40) may or may not be of a monolithic construction. That is, the various components of the body 28 may be formed as a single, unitary (i.e., one-piece) structure. Alternatively, the body 28 may be formed from a plurality of structures (i.e., two or more structures) that are secured to one another (i.e., the body 28 may have a "multi-piece" construction). For example, the plurality of structures may be fused together, welded together, bonded together using any suitable adhesive, and/or secured to one another using another suitable method and/or means that enables the brew basket 18 to function as described and/or illustrated herein. The body 28 may or may not have a generally rigid construction. Optionally, the body 28 is collapsible.

The brew basket 18 may be fabricated from any suitable material(s), which may or may not be selected to provide the brew basket 18 as disposable and/or to provide the brew basket 18 with a generally rigid construction. One example of a material suitable for fabricating the brew basket 18 is vacuum formed high-impact polystyrene, which may be relatively inexpensive, may be generally easy to work with in manufacturing, and/or may produce a sufficiently strong product with a minimum thickness of material. But, other materials having similar and/or different qualities could be used without departing from the scope of embodiments described and/or illustrated herein. For example, the brew basket 18 may be at least partially fabricated from one or more metals, for example by stamping the brew basket 18 out of a sheet of metal(s) or by laminating a foil of one or more metals (referred to herein as a "metallic foil") with one or more other materials, such as, but not limited to, paper, plastic, a natural material, and/or the like. The brew basket 18 may be stamped out of the sheet of metal(s) as a single piece. Alternatively, two or more components of the body 28 are separately stamped out one or more sheets of metals) and thereafter joined together to form the brew basket 18. The sheet of metals) may have a thickness selected to provide a predetermined rigidity to the brew basket 18. The selected thickness may depend on the properties of the particular metal(s) selected.

Similarly, a thickness of the material(s) laminated with the metallic foil may be selected to support the foil to provide a predetermined rigidity to the brew basket 18. The metallic foil and other material(s) may be laminated together in any suitable configuration and/or arrangement. For example, the other material(s) may form the core structure of the body 28, and the metallic foil may be laminated on an interior side of the body 28 to provide the brew basket 18 with a non-porous surface within the brewing reservoir 30, whether or not the other materials) are porous. The non-porous surface within the brewing reservoir 30 may prevent water and/or brewed coffee from flowing through the sidewalls 50, 52, and/or 54 of the body 28 such that the water and/or brewed coffee instead flows from the brewing reservoir 30 into the receiving vessel 22 through the opening 28. In addition or alternatively to being laminated to the interior side of the body 28, the metallic foil may be laminated on an exterior side of the body 28 to provide structure, support, and/or non-porosity thereto.

One example of a suitable metal for fabricating the brew basket 18 is aluminum, although the brew basket 18 is not limited to being fabricated from aluminum. Aluminum may be selected as a material of the brew basket 18 because of its cost and/or weight relative to some other metals. However, any suitable metal or combination of metals that enables the brew basket 18 to function as described and/or illustrated herein may be used to fabricate the brew basket 18, for example based on the properties, composition, cost, and/or convenience thereof.

Another non-limiting example of materials that may be used to fabricate the brew basket 18 includes paper that is at least partially impregnated and/or coated with one or more materials that facilitate providing the brew basket 18 with a non-porous surface within the brewing reservoir 30 and/or one or more other segments of the body 28. The paper may be any suitable type of paper that enables the brew basket 18 to function as described and/or illustrated herein. The type of paper and its thickness may each be selected to provide a predetermined rigidity to the brew basket 18. The material(s) impregnated within, and/or coating, the paper may be any suitable material(s) that enables the brew basket 18 to function as described and/or illustrated herein, and that facilitates providing non-porosity to all or a portion of the body 28 of the brew basket 18, such as, but not limited to, plastic, wax, and/or the like. The material impregnated within, and/or coating, the paper may provide structure and/or support to the paper to facilitate providing the brew basket 18 with a predetermined rigidity.

Another non-limiting example of materials that may be used to fabricate the brew basket 18 includes one or more plastics and/or other polymers. For example, the brew basket 18 may be formed from one or more thermoplastics, such as, but not limited to, acrylonitrile butadiene styrene (ABS), acrylic, celluloid, ethylene vinyl alcohol (EVAL), fluoroplastics, ionomers, liquid crystal polymer (LCP), polyacetal (PQM), polyacrylates, polyamide (PA), polyamide-imide (PAD, polyaryletherketone (PAEK), polybutylene terephthalate (PBT), polyethylene terephthalate (PET), polycarbonate (PC), polyketone (PK), polyester, polyethylene, polyetheretherketone (PEEK), polyetherimide (PEI), polyimide (PI), polylactic acid (PLA), polypropylene (PP), polystyrene (PS), polysulfone (PSU), and/or polyvinyl chloride (PVC). Another example of plastics and/or other polymers that may be used to fabricate the brew basket 18 includes one or more expanded and/or extruded polymers. For example, one or more expanded plastics, sometimes referred to as foamed plastics, may be used to fabricate the brew basket 18, such as, but not limited to, expanded polystyrene and/or the like. Extruded plastics, such as, but not limited to, extruded polystyrene, are other non-limiting examples of polymers that may be used to fabricate the brew basket 18. Still other non-limiting examples of plastics or other polymers that may be used to make the brew basket 18 include thermosets, such as, but not limited to, phenol formaldehyde resin, duroplast, polyester resin, epoxy resin, and/or the like.

The formed plastic(s) and/or other polymer(s) may have a thickness selected to provide a predetermined rigidity to the brew basket 18. Such a selected thickness may depend upon the properties of the particular plastie(s) and/or polymer(s) selected. Any suitable plastic(s), polymer(s), thermoplastic(s), thermoset(s), extruded polymer(s), and/or expanded polymer(s) that enables the brew basket 18 to function as described and/or illustrated herein may be used to fabricate the brew basket 18, for example based on the properties, composition, cost, and/or convenience thereof.

Yet another non-limiting example of materials that may be used to fabricate the brew basket 18 includes one or more natural materials, such as, but not limited to, a pulp, rice hulls, wheat chaff, sugar can pulp, wood, cellulose, and/or the like. The natural material(s) may have a thickness selected to provide a predetermined rigidity to the brew basket 18. Such a selected thickness may depend upon the properties of the particular plastic(s) and/or polymer(s) selected. Any suitable natural material(s) that enables the brew basket 18 to function as described and/or illustrated herein may be used to fabricate the brew basket 18, for example based on the properties, composition, cost, and/or convenience thereof. Optionally, the natural material(s) is at least partially impregnated and/or coated with one or more materials that facilitate providing the brew basket 18 with a non-porous surface within the brewing reservoir 30 and/or one or more other segments of the body 28. The material(s) impregnated within, and/or coating, the natural material(s) may be any suitable material(s) that enables the brew basket 18 to function as described and/or illustrated herein, and that facilitates providing non-porosity to all or a portion of the body 28 of the brew basket 18, such as, but not limited to, plastic, wax, and/or the like. The material impregnated within, and/or coating, the natural material(s) may provide structure and/or support to the paper to facilitate providing the brew basket 18 with a predetermined rigidity.

FIGS. 6-9 illustrate an embodiment of a filter pack 66 for use with the brew basket 18 (FIGS. 1-5 and 10-15). The filter pack 66 includes a liquid permeable pouch 68 that contains and encloses the coffee grounds 110. Specifically, the pouch 68 includes an internal chamber 108 within which the coffee grounds are contained. The pouch 68 of the filter pack 66 is configured to be held within the brewing reservoir 30 (FIGS. 1-5 and 10-15) of the brew basket 18 for receiving heated water from the brewing machine 10 (FIG. 1) during a brewing operation. During the brewing operation, the heated water saturates the coffee grounds 110 contained within the filter pack 66 and thereby brews coffee.

The pouch 68 of the filter pack 66 includes a generally tapered multi-sided 3D shape and size that is substantially similar to and complementary with the 3D shape and size of the brewing reservoir 30 (FIGS. 1-5 and 10-15) of the brew basket 18. Specifically, the pouch has multiple sides and multiple vertices joined together to form the generally tapered multi-sided 3D shape that encloses the coffee grounds 110. In the illustrated embodiment, the multi-sided 3D shape of the pouch 68 of the filter pack 66 constitutes a tetrahedral shape, and more specifically a triangular pyramid. Specifically, the pouch 68 of the filter pack 66 includes four sides 72, 74, 76, and 78 that are shaped as equilateral triangles having approximately the same size as each other. The sides 72, 74, 76, and 78 are arranged in the illustrated triangular pyramid shape, which includes four vertices 80, 82, 84, and 86 at which the sides 72, 74, 76, and 78 intersect. The vertex 80 is not visible in FIG. 7. In the illustrated embodiment, the pouch 68 of the filter pack 66 includes a seam 114 that extends a width $W_1$ (not labeled in FIG. 6, 7, or 9). The seam 114 may have any width $W_1$, such as, but not limited to, between approximately 6 millimeters (mm) and approximately 10 mm, approximately 7.5 mm, approximately 8.0 mm, and/or the like. In other embodiments, the pouch 68 may be formed without the seam 114.

Figure 7:
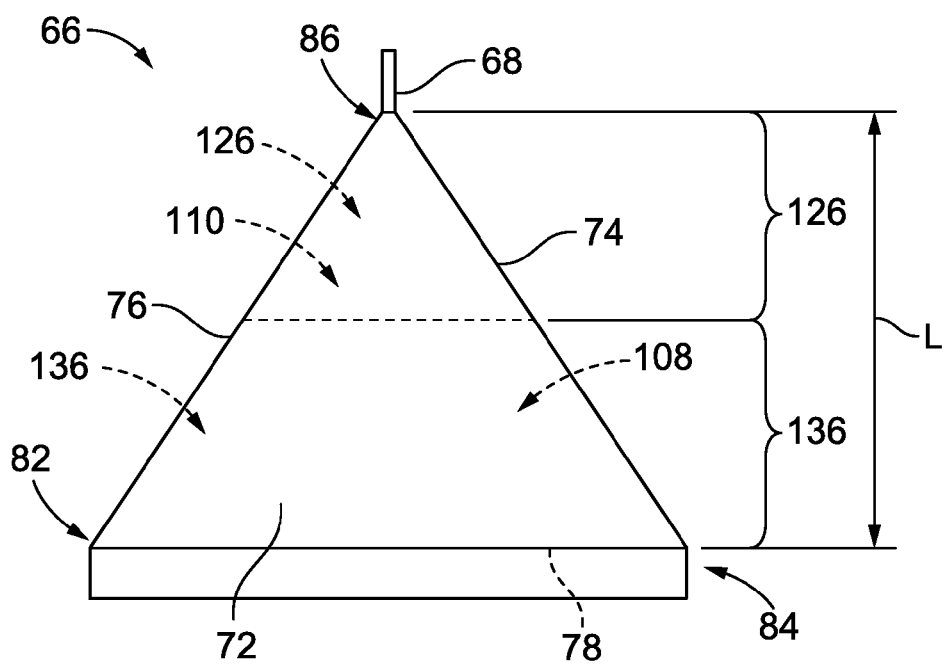
FIG. 7 is an elevational view of the filter pack shown in FIG. 6.
Figure 8:
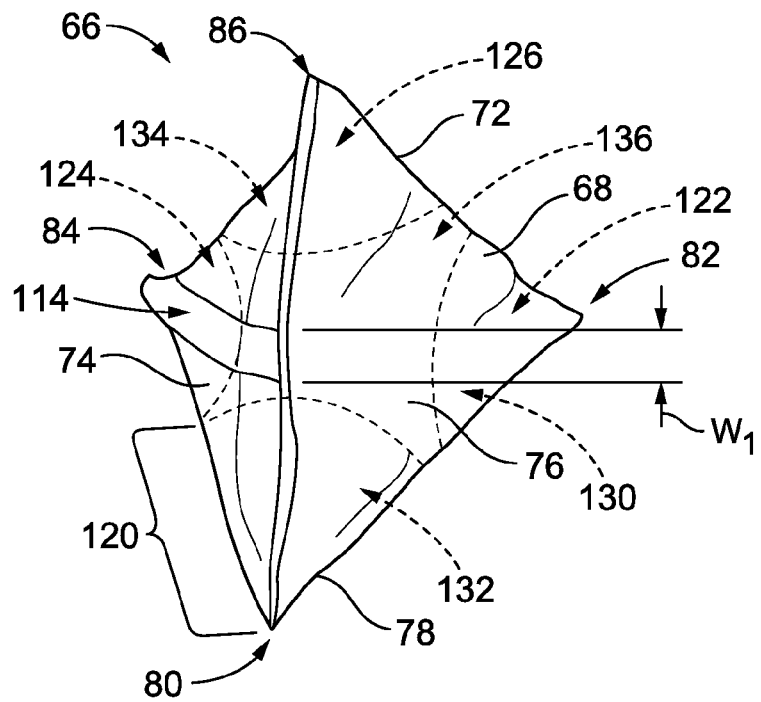
FIGS. 8 and 9 are other perspective views of the filter pack shown in FIGS. 6 and 7 illustrating the filter pack from different orientations than FIG. 6.
Figure 9:
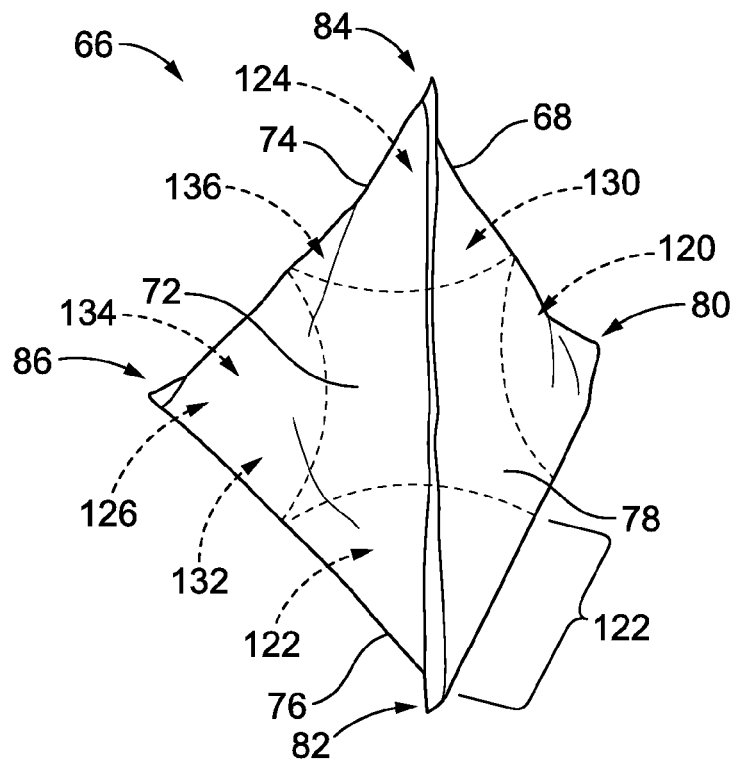

The multi-sided 3D shape of the pouch 68 extends a length from each side 72, 74, 76, and 78 to the opposing associated vertex 80, 82, 84, and 86, respectively. FIG. 7 illustrates one of the lengths L of the filter pack 66 as measured from the side 78 to the opposing vertex 86. As described above, the multi-sided 3D shape of the pouch 68 of the filter pack 66 is generally tapered. Specifically, the multi-sided 3D shape of the pouch 68 is tapered from each side 72, 74, 76, and 78 to the associated opposed vertex 80, 82, 84, and 86, respectively. Optionally, the multi-sided 3D shape of the pouch 68 is continuously tapered from each side 72, 74, 76, and 78 to the associated opposed vertex 80, 82, 84, and 86, respectively. In other words, the multi-sided 3D shape of the pouch 68 is optionally continuously tapered from the closed top to the inverted vertex 80, 82, 84, or 86. Optionally, the amount of taper of the pouch 68 is substantially even from each side 72, 74, 76, and 78 to the associated opposed vertex 80, 82, 84, and 86, respectively.

The filter pack 66 is configured to be held within the brewing reservoir 30 such that one of the vertices 80, 82, 84, or 86 is inverted within the brewing reservoir 30 and such that a closed top of the pouch 68 faces upward toward the open top 34 (FIGS. 2-5 and 10-15) and/or is located proximate the open top 34 of the brewing reservoir 30. As used herein, an "inverted" vertex 80, 82, 84, or 86 and an "inverted position" of the filter pack 66 and/or the pouch 68 are intended to mean a position within the brewing reservoir 30 with one of the vertices 80, 82, 84, or 86 being inserted into the bottom end 36 such that the vertices 80, 82, 84, or 86 faces downward toward the opening 38 of the brewing reservoir 30. In the illustrated embodiment, any of the vertices 80, 82, 84, or 86 may be inverted within the brewing reservoir 30. Specifically, the sides 72, 74, 76, and 78 of the pouch 68 are joined together to form a universal orientation such that the sides 72, 74, 76, and 78 maintain the multi-sided 3D shape and size of the pouch 68 as complementary with the multi-sided 3D shape and size of the brewing reservoir 30 when the filter pack 66 is oriented with any one of the vertices 80, 82, 84, or 86 inserted into the bottom end 36 of the brewing reservoir 30. In other words, the sides 72, 74, 76, and 78 and vertices 80, 82, 84, and 86 of the pouch 68 form a polygon that fits within the brewing reservoir 30 when oriented one of two or in any one of multiple inverted positions, where a different associated one of the vertices 80, 82, 84, and 86 is located proximate to the bottom end 36 of the brewing reservoir 30 in each of the associated inverted positions. In other embodiments, the pouch 68 is configured to be held within the brewing reservoir 30 in only one (i.e., a single) inverted position. In other words, in other embodiments, the pouch 68 has a geometry such that only one of the vertices 80, 82, 84, or 86 is configured to be inserted into the bottom end 36 facing downward toward the opening 38.

Any of the sides 72, 74, 76, or 78 may define the closed top of the filter pack 66. Specifically, the pouch 68 of the filter pack 66 is configured to be received within the brewing reservoir 30 of the brew basket 18 with any one of the sidewalls 72, 74, 76, or 78 being positioned as the uppermost one of the sides 72, 74, 76, or 78 (i.e., the side 72, 74, 76, or 78 that faces toward and/or is located proximate the open top 34 of the brewing reservoir 30). As will be described below, the closed top of the pouch 68 is configured to receive heated water from the brewing machine 10 (FIG. 1) during a brewing operation with the brewed coffee discharging from the inverted vertex 80, 82, 84, or 86.

The sides 72, 74, 76, and 78 and the vertices 80, 82, 84, and 86 of the pouch 68 are joined together to form the multi-sided 3D shape with the funnel shaped segments 120, 122, 124, and 126. The funnel shaped segments 120, 122, 124, and 126 are positioned proximate associated vertices 80, 82, 84, and 86, respectively. The universal orientation of the pouch 68 enables the filter pack 66 to be received within the brewing reservoir 30 such that the coffee grounds 110 fill any one of the funnel-shaped segments 120, 122, 124, or 126 when the pouch 68 is oriented with the associated vertex 80, 82, 84, or 86, respectively, inverted (i.e., at the bottom end 36 of the brewing reservoir 30), for example to facilitate extraction from the coffee grounds 110. The universal orientation of the pouch 68 of the filter pack 66 also enables the pouch 68 to be received within the brewing reservoir 30 such that any one of the funnel-shaped segments 120, 122, 124, or 126 of the filter pack 66 substantially fills the funnel-shaped segment 56 (FIGS. 2-5, 11, 12, 14, and 15) of the brewing reservoir 30, for example to facilitate extraction from the coffee grounds 110.

The funnel-shaped segments 120, 122, 124, and 126 each have a volume that is configured to hold the coffee grounds 110. The pouch 68 of the filter pack 66 includes the plurality of head spaces 130, 132, 134, and 136, which extend between the associated funnel-shaped segments 120, 122, 124, and 126, respectively, and the associated opposing side 72, 74, 76, and 78, respectively. The universal orientation of the pouch 68 enables the pouch 68 to be received within the brewing reservoir 30 such that any one of the head spaces 130, 132, 134, or 136 extends between the coffee grounds 110 and the closed top 90 of the filter pack 66 when the pouch 68 is oriented with the associated funnel-shaped segment 120, 122, 124, or 126, respectively, within the funnel-shaped segment 56 of the brewing reservoir 30, for example to facilitate extraction from the coffee grounds 110. The universal orientation of the pouch 68 enables the pouch 68 to be received within the brewing reservoir 30 such that any one of the head spaces 130, 132, 134, or 136 extends within the head segment 128 (FIGS. 11 and 12) of the brewing reservoir 30 when the pouch 68 is oriented with the associated funnel-shaped segment 120, 122, 124, or 126, respectively, within the funnel-shaped segment 56 of the brewing reservoir 30, for example to facilitate extraction from the coffee grounds 110.

The operation and advantages of the generally tapered multi-sided 3D shape of the filter pack 66 will be described in more detail below. The multi-sided 3D shape of the pouch 68 of the filter pack 66 may be continuously tapered by any amount of taper. For example, the internal chamber 108 may have any volume, the funnel-shaped segments 120, 122, 124, and 126 may each have any volume, and the head spaces 130, 132, 134, and 136 may have any volume.

Selection of the volume of the internal chamber 108 of the filter pack 66, the volume of each of the funnel-shaped segments 120, 122, 124, and 126, and/or the volume of each of the head spaces 130, 132, 134, and 136 may be selected to: (1) increase the turbulence of heated water moving through the brewing reservoir 30; (2) create a seal between the filter pack 66 and the body 28 of the brew basket 18; (3) prevent or reduce the amount of heated water that flows around the filter pack 66 and through the opening 38 without saturating the coffee grounds 110; (4) increase the amount of heated water that saturates the coffee grounds 110; and/or (5) affect the quality of the brewed coffee.

The multi-sided 3D shape of the pouch 68 of the filter pack 66 is not limited to the triangular pyramid shape of the illustrated embodiment of the filter pack 66, but rather may additionally or alternatively include any other shape that is complementary with the brew basket 18. In other words, in addition or alternatively to the triangular pyramid shape, the multi-sided 3D shape of the filter pack 66 may include any other shape that is defined by any number of sides greater than two, such as, but not limited to, a cross-sectional shape defined by two side edges (i.e., a shape defined by three sides), a different triangular cross-sectional shape, a different tetrahedral shape, a rectangular cross-sectional shape (i.e., a shape defined by five sides), a square cross-sectional shape (i.e., a shape defined by five equilateral sides), an octagonal cross-sectional shape (i.e., a shape defined by six sides), a shape defined by at least five sides sidewalls, a shape defined by at least six sides, and/or the like. Various non-limiting examples of other multi-sided 3D shapes of the filter pack 66 are described below with reference to FIGS. 17 and 18.

In some embodiments, the pouch 68 of the filter pack 66 contains an amount of the coffee grounds 110 appropriate for brewing a single serving of coffee, and is optionally designed to be used once (or for a limited number of uses) and then discarded. Alternatively, the pouch 68 of the filter pack 66 contains a sufficient amount of the coffee grounds 110 to brew more than a single serving of coffee in a single brewing operation.

The pouch 68 of the filter pack 66 may be fabricated from any materials, such as, but not limited to, paper, a mesh, a metal, nylon, a natural material (e.g., a pulp, rice hulls, wheat chaff, sugar can pulp, wood, cellulose, and/or the like), and/or the like. The pouch 68 may have any porosity to provide the pouch 68 with any amount of liquid permeability.

Optionally, one filter pack 66 and one brew basket 18 may be packaged together in a package for use. The filter pack 66 may or may not be adhered or otherwise connected to the body 28 of the basket 18. The brew baskets 18 and the filter packs 66 may also be packaged and sold separately from one another. The brew baskets 18 and the filter packs 66 may be packaged, whether together or separately, using any suitable packaging material(s), such as, but not limited to, paper, plastic, a natural material (e.g., a pulp, rice hulls, wheat chaff, sugar can pulp, wood, cellulose, and/or the like), and/or the like. The paper, plastic, natural material, and/or other material(s) may be laminated and/or coated with any suitable material(s), such as, but not limited to, a metallic foil, wax, and/or the like. The packaging material used to package the brew baskets 18 and/or the filter packs 66 may be sealed, for example to facilitate preventing damage to, contamination of, and/or degradation of the brew baskets 18 and/or the filter packs 66 during storage and/or shipping. The packaging material may be sealed using any suitable structure and/or means, such as, but not limited to, heat, adhesive, compression, and/or other fastening mechanisms, such as, but not limited to, clips, string, wires, fastening mechanisms that include a deformable wire (e.g., a bread tie), and/or the like. The packaging material may be hermetically sealed, for example, to facilitate preventing damage to, contamination of, and/or degradation of the brew baskets 18 and/or the filter packs 66 during storage and/or shipping. Moreover, in addition to the hermetic seal, the brew baskets 18 and/or the filter packs 66 may also be vacuum packaged.

Optionally, an assembly of the brew basket 18 and filter pack 66 may be provided as a K-Cup® or similar single-cup coffee brewing capsule, puck, and/or the like. Similarly, an assembly of the brew basket 18 and filter pack 66 are optionally provided as an espresso capsule, puck, and/or the like, such as, but not limited to, the espresso capsules available from Nespresso, of Lausanne, Switzerland.

Figure 10:
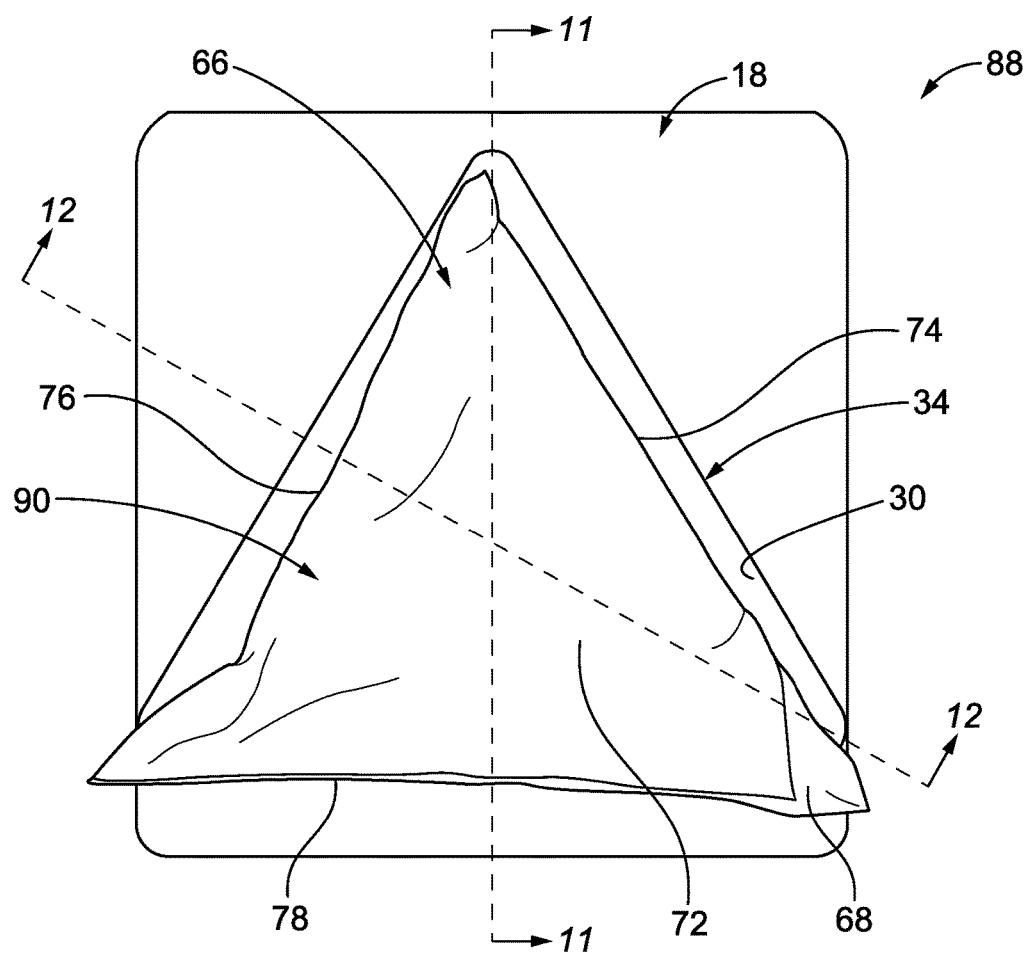
FIG. 10 is a plan view of an assembly of the brew basket shown in FIGS. 2-5 and the filter pack shown in FIGS. 6-9 illustrating the assembly before a brewing operation has been initiated.
Figure 12:
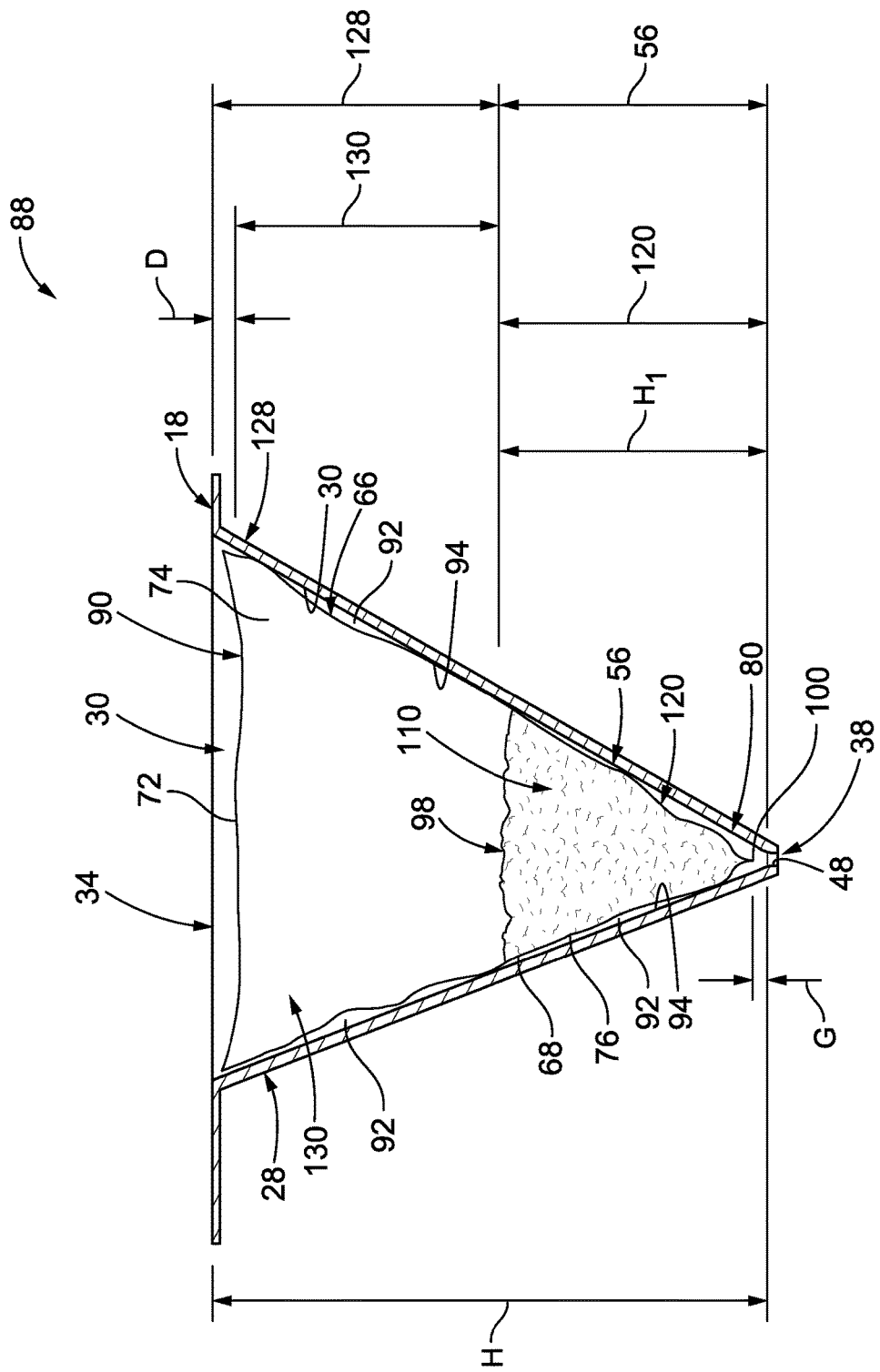
FIG. 12 is another cross-sectional view of the assembly shown in FIG. 10 taken along line 12-12 of FIG. 10.

FIG. 10 is a plan view of an assembly 88 of the brew basket 18 and the filter pack 66 before a brewing operation has been initiated. FIGS. 11 and 12 are cross-sectional views of the assembly 88 taken along lines 11-11 and 12-12, respectively, of FIG. 10. FIGS. 10-12 illustrate the filter pack 66 held within the brewing reservoir 30 of the brew basket 18. Specifically, the pouch 68 of the filter pack 66 has been inserted into the brewing reservoir 30 through the open top 34 of the brewing reservoir 30. As can be seen in each of FIGS. 10-12, the filter pack 66 is held within the brewing reservoir 30 such that a closed top 90 of the filter pack 66 faces upward toward, and may or may not be located proximate to and/or extend past, the open top 34 of the brew basket 18. The closed top 90 of the filter pack 66 may be spaced apart from the open top 34 by any distance D (not labeled in FIG. 10).

As described above, the multi-sided 3D shape of the filter pack 66 enables any of the sidewalls 72, 74, 76, or 78 to define the closed top 90 of the filter pack 66. In other words, the pouch 68 of the filter pack 66 can be oriented within the brewing reservoir 30 such than any of the sidewalls 72, 74, 76, or 78 faces upward toward the open top 34 of the brew basket 18. In the illustrated embodiment, the filter pack 66 is oriented within the brewing reservoir 30 such that the sidewall 72 defines the closed top 90 of the filter pack 66. But, alternatively the filter pack 66 may be oriented within the brewing reservoir 30 such that the sidewall 74, the sidewall 76, or the sidewall 78 defines the closed top 90 of the filter pack 66. The sidewall 76 is not visible in FIG. 11. The sidewall 78 is not visible in FIG. 12.

As can be seen in FIGS. 10-12, before the brewing operation is initiated (i.e., before the heated water has been dispensed into the brewing reservoir 30), one or more voids 92 may exist between the pouch 68 of the filter pack 66 and an interior surface 94 of the body 28 of the brew basket 18 that bounds the brewing reservoir 30. The voids 92 may be caused by the flexible nature and/or porosity of the pouch 68 of the filter pack 66, which may enable various indentations and/or other depressions to be formed in the multi-sided 3D shape of the pouch 68 and thereby define the voids 92.

Referring now solely to FIGS. 11 and 12, as described above, the multi-sided 3D shape of the pouch 68 of the filter pack 66 enables any one of the vertices 80, 82, 84, or 86 to be inverted within the brewing reservoir 30. In the illustrated embodiment, the pouch 68 of the filter pack 66 is oriented within the brewing reservoir 30 such that the vertex 80 is in the inverted position. But, alternatively the pouch 68 of the filter pack 66 may be oriented within the brewing reservoir 30 such that the vertex 82, the vertex 84, or the vertex 86 is in the inverted position. The vertices 82 and 84 are not visible in FIG. 11.

As described above, the universal orientation of the filter pack 66 enables the sides 72, 74, 76, and 78 to maintain the multi-sided 3D shape and size of the pouch 68 as complementary with the multi-sided 3D shape and size of the brewing reservoir 30 when the filter pack 66 is oriented with any one of the vertices 80, 82, 84, or 86 in the inverted position. In the illustrated embodiment, and as can be seen in FIGS. 11 and 12, the universal orientation of the filter pack 66 maintains the multi-sided 3D shape and size of the pouch 68 as complementary with the multi-sided 3D shape and size of the brewing reservoir 30 when the filter pack 66 is oriented with the vertex 80 in the inverted position. In other words, the pouch 68 forms a polygon that fits within the brewing reservoir 30 when the vertex 80 is in the inverted position (i.e., is located proximate to the bottom end 36 of the brewing reservoir 30). The vertices 82 and 86 are not visible in FIG. 12. As shown in FIGS. 11 and 12, in the illustrated embodiment, the pouch 68 is received within the brewing reservoir 30 such that the head space 130 extends within the head segment 128 of the brewing reservoir 30.

As described above, the universal orientation of the pouch 68 enables the filter pack 66 to be received within the brewing reservoir 30 such that the coffee grounds 110 fill any one of the funnel-shaped segments 120, 122, 124, or 126. As shown in FIGS. 11 and 12, in the illustrated embodiment, the coffee grounds 110 contained within the pouch 68 fill the funnel-shaped segment 120 because the associated vertex 80 is in the inverted position. In other words, gravity causes the coffee grounds 110 contained within the pouch 68 to collect in a pile 98 within the funnel-shaped segment 120.

The universal orientation of the pouch 68 of the filter pack 66 also enables the pouch 68 to be received within the brewing reservoir 30 such that any one of the funnel-shaped segments 120, 122, 124, or 126 of the filter pack 66 substantially fills the funnel-shaped segment 56 of the brewing reservoir 30, as is also described above. In the illustrated embodiment, the pouch 68 is received within the brewing reservoir 30 such that the funnel-shaped segment 120 substantially fills the funnels-shaped segment 56 of the brewing reservoir 30. For example, the funnel-shaped segment 56 of the brewing reservoir 30 extends a height $H_1$ upward from the side edge 48 of the opening 38. In the illustrated embodiment, a vertical gap G extends between an edge 100 of the vertex 80 of the pouch 68 and the edge 48 of the opening 38. As used herein, in some embodiments, the funnel-shaped segment 120 of the pouch 68 "substantially fills" the funnel-shaped segment 56 of the brewing reservoir when the vertical gap G is less than approximately 5% of the height H of the brewing reservoir 30 of the brew basket 18. In some embodiments, the vertical gap G is less than approximately 2.5% of the height H of the brewing reservoir 30. In still other embodiments, the funnel-shaped segment 120 fills an approximate entirety of the height $H_1$ of the funnel-shaped segment 56 of the brewing reservoir 30. In other words, in some embodiments no vertical gap G extends between the edge 100 and the edge 48 (i.e., the vertical gap G has a value of zero or has a negative value). For example, the edge 100 of the vertex 80 may extend into the opening 38 such that the vertical gap G has a negative value. In other embodiments, the vertical gap G is greater than approximately 5% and/or greater than approximately 10% of the height H of the brewing reservoir 30 of the brew basket 18.

In some embodiments, the funnel-shaped segment 120 of the filter pack 66 "substantially fills" the funnel-shaped segment 56 of the brewing reservoir 30 when the vertical gap G is equal to or less than approximately 0.2 inches. Optionally, the vertical gap G is equal to or less than approximately 0.1 inches. In some embodiments, the vertical gap G has a value of zero or has a negative value. In other embodiments, the vertical gap G is greater than approximately 0.2 inches and/or greater than approximately 1.0 inches.

As can be seen in FIGS. 11 and 12, the funnel-shaped segment 56 of the brewing reservoir 30 defines the grounds retention segment of the brewing reservoir 30 that holds the coffee grounds 110 enclosed in the filter pack 66.

By substantially filling the funnel-shaped segment 56 of the brewing reservoir 30, the filter pack 66 may facilitate creating a seal between the pouch 68 of the filter pack 66 and the body 28 of the brew basket 18, which may facilitate extraction from the coffee grounds 110, for example, by preventing or reducing the amount of heated water that flows around the pouch 68 of the filter pack 66 and through the opening 38 without saturating the coffee grounds 110 and/or increasing the amount of heated water that saturates the coffee grounds 110. Substantially filling the funnel-shaped segment 56 of the brewing reservoir 30 with the funnel-shaped segment 120 of the filter pack 66 therefore may affect the quality of the brewed coffee, for example by increasing the strength of the brewed coffee (e.g., the amount of TDS per unit of heated water within the brewed coffee) and/or by increasing the extraction yield (i.e., the amount of coffee ground soluables that have moved from the filter pack 66 to the brewed coffee) of the brewed coffee.

Substantially filling the funnel-shaped segment 56 of the brewing reservoir 30 may facilitate increasing the turbulence of heated water moving through the brewing reservoir 30, which may facilitate extraction from the coffee grounds 110, for example, by preventing or reducing the amount of heated water that flows through the brewing reservoir 30 without saturating the coffee grounds 110 and/or by increasing the amount of heated water that saturates the coffee grounds 110. For example, substantially filling the funnel-shaped segment 56 of the brewing reservoir 30 may provide a deeper bed depth of the pile 98 of the coffee grounds 110 as compared to at least some known coffee brewing machines, which, for example, may provide a slower and/or more efficient brewing process. Substantially filling the funnel-shaped segment 56 of the brewing reservoir 30 with the funnel-shaped segment 120 of the filter pack 66 therefore may affect the quality of the brewed coffee, for example by increasing the strength of the brewed coffee (e.g., the amount of TDS per unit of heated water within the brewed coffee) and/or by increasing the extraction yield (i.e., the amount of coffee ground soluables that have moved from the filter pack 66 to the brewed coffee) of the brewed coffee.

The amount of the funnel-shaped segment 56 of the brewing reservoir 30 that is filled by the funnel-shaped segment 120 of the filter pack 66 may be selected to: (1) increase the turbulence of heated water moving through the brewing reservoir 30; (2) create a seal between the pouch 68 of the filter pack 66 and the body 28 of the brew basket 18, for example as described below; (3) prevent or reduce the amount of heated water that flows around the pouch 68 of the filter pack 66 and through the opening 38 without saturating the coffee grounds 110; (4) increase the amount of heated water that saturates the coffee grounds; and/or (5) affect the quality of the brewed coffee.

Figure 13:
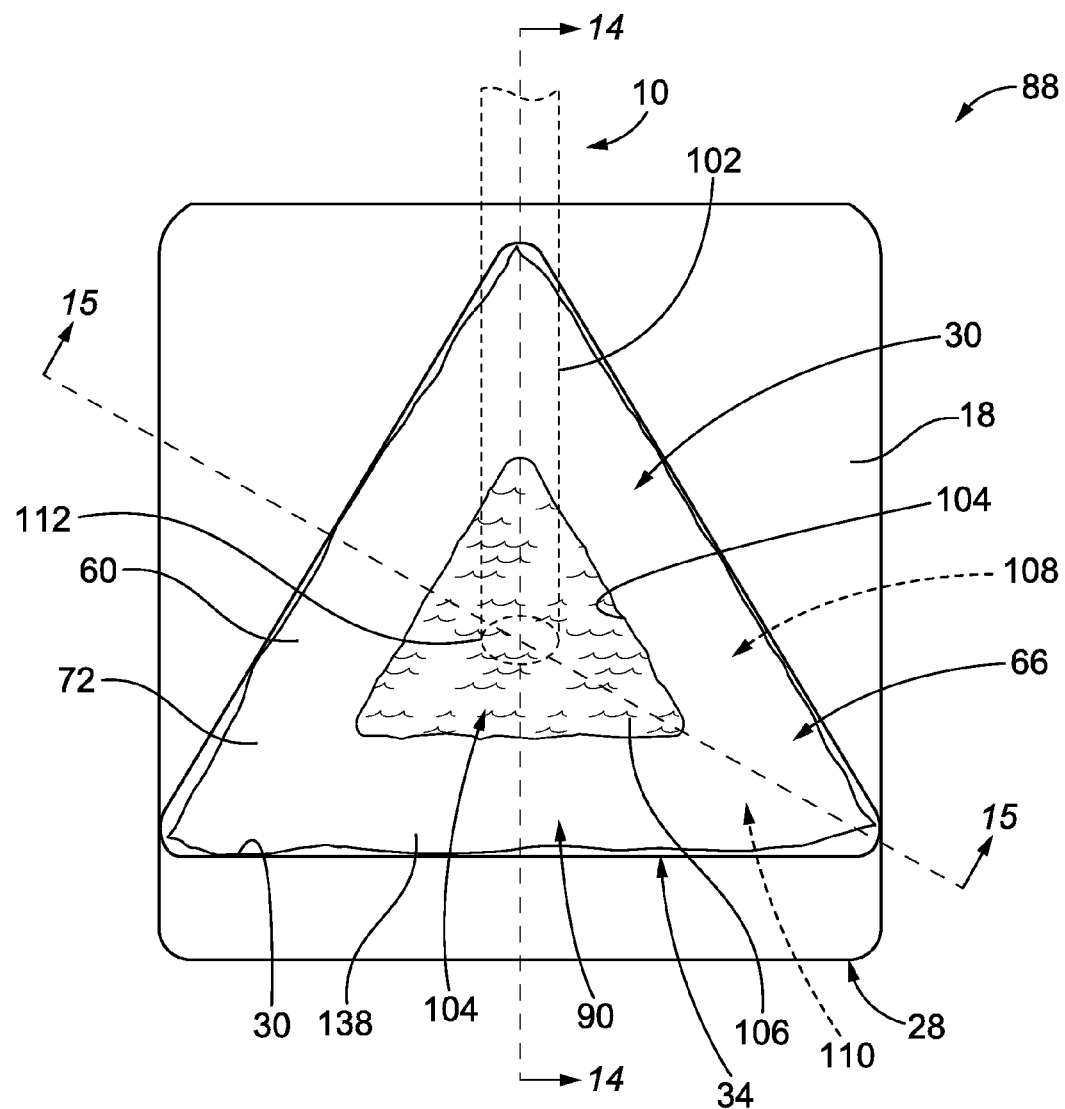
FIG. 13 is a plan view of the assembly shown in FIGS. 10-12 illustrating the assembly after a brewing operation has been initiated.

FIG. 13 is a plan view of the assembly 88 of the brew basket 18 and the filter pack 66 illustrating the assembly 88 after a brewing operation has been initiated. Specifically, FIG. 13 illustrates the assembly 88 after heated water has been dispensed from a nozzle 102 of the brewing machine 10 into the brewing reservoir 30 of the brew basket 18. The nozzle 102 is a component of the brewing machine 10 that is configured to direct water that has been heated by the brewing machine 10 into the brewing reservoir 30. For clarity, the nozzle 102 is the only other component of the brewing machine 10 (besides the brew basket 18 and filter pack 66, which each may or may not be considered a component of the brewing machine 10) that is shown in FIG. 13. The nozzle 102 of the brewing machine 10 is shown in phantom in FIG. 13 for clarity.

As shown in FIG. 13, in some embodiments, the heated water dispensed from the nozzle 102 is configured to pool on the closed top 90 of the filter pack 66. In other words, the heated water is configured to pool on an exterior surface 138 of the side 72 of the pouch 68 of the filter pack 66. As the heated water is dispensed from an outlet 112 of the nozzle 102 onto the closed top 90, the heated water forms a water pooling pocket 104 along the closed top 90, for example to facilitate extraction from the coffee grounds 110. The heated water forms a pool 106 in the water pooling pocket 104 as the heated water diffuses through the closed top 90 of the pouch 68 into the internal chamber 108 of the filter pack 66. The outlet 112 of the nozzle 102 may be positioned at any location relative to the brewing reservoir 30 (i.e., any location along the closed top 90 of the filter pack 66) that enables the heated water to form the pool 106 in the pooling pocket 104. In the illustrated embodiment, the outlet 112 of the nozzle 102 is positioned relative to the brewing reservoir 30 such that the nozzle 102 is configured to direct the heated water onto an approximate center of the closed top 90 of the filter pack 66. The porosity of the pouch 68, the rate at which the heated water is dispensed onto the closed top 90, the location of the outlet 112 of the nozzle 102 relative to the brewing reservoir 30, and/or the amount of heated water that is dispensed onto the closed top 90 may be selected to enable the heated water to form the pool 106 and/or to provide a predetermined amount of pooling (i.e., the amount of water contained within the pool 106). The pool 106 and pooling pocket 104 may have any shape and size along the closed top 90.

The pool 106 may contain any amount of water at a given time. In some embodiments, the amount of water contained in the pool 106 is not a noticeable volume of water. For example, the amount of water contained in the pool 106 may not be a noticeable volume of water that is visible by the human eye without using a microscope or other magnification device (i.e., may not be visible to the naked eye).

In some alternative embodiments, the heated water dispensed from the nozzle 102 does not pool on the closed top 90 of the filter pack 66. In other words, in some alternative embodiments, the heated water diffuses through the closed top 90 of the pouch 68 and into the internal chamber 108 without forming the pool 106 on the closed top 90. Moreover, in some embodiments, and in addition or alternatively to pooling on the closed top 90 of the filter pack 66, the heated water dispensed from the nozzle 102 is configured to pool within the internal chamber 108 of the filter pack 66 on the pile 98 of the coffee grounds 110.

The pooling of the heated water along the closed top 90 of the filter pack 66 (and/or on the pile 98 of the coffee grounds 110) may facilitate extraction from the coffee grounds 110, for example by preventing or reducing the amount of heated water that flows around the pouch 68 of the filter pack 66 and through the opening 38 (shown in FIGS. 2-5 and 10-15) without saturating the coffee grounds 110. In other words, the pooling of the heated water along the closed top 90 (and/or on the pile 98 of the coffee grounds 110) may decrease the amount of the heated water that flows between the pouch 68 and the body 28 of the brew basket 18 instead of entering the internal chamber 108 of the filter pack 66, and may thereby increase the amount of the heated water that flows into the internal chamber 108 of the filter pack 66 and saturates the coffee grounds 110. The pooling of the heated water therefore may affect the quality of the brewed coffee, for example by increasing the strength of the brewed coffee and/or by increasing the extraction yield of the brewed coffee.

The pooling of the heated water along the closed top 90 of the filter pack (and/or on the pile 98 of the coffee grounds 110) may facilitate creating a seal between the pouch 68 of the filter pack 66 and the body 28 of the brew basket 18, which may prevent or reduce the amount of heated water that flows around the filter pack 66 and through the opening 38 without saturating the coffee grounds 110 and/or may increase the amount of heated water that saturates the coffee grounds 110. As described above, a seal between the pouch 68 and the body 28 may affect the quality of the brewed coffee.

The pooling of the heated water along the closed top 90 of the filter pack 66 (and/or on the pile 98 of the coffee grounds 110) may facilitate increasing the turbulence of heated water moving through the brewing reservoir 30, which may facilitate extraction from the coffee grounds 110, for example, by preventing or reducing the amount of heated water that flows through the brewing reservoir 30 without saturating the coffee grounds 110 and/or by increasing the amount of heated water that saturates the coffee grounds 110. For example, the pooling of the heated water may provide a deeper bed depth of the pile 98 of the coffee grounds 110 as compared to at least some known coffee brewing machines, which, for example, may provide a slower and/or more efficient brewing process. The pooling of the heated water therefore may affect the quality of the brewed coffee, for example by increasing the strength of the brewed coffee and/or by increasing the extraction yield of the brewed coffee.

The amount of pooling (e.g., the volume of water contained in the pool 106) of the heated water along the closed top 90 of the filter pack 66 (and/or on the pile 98 of the coffee grounds 110) may be selected to: (1) increase the turbulence of heated water moving through the brewing reservoir 30; (2) create a seal between the pouch 68 of the filter pack 66 and the body 28 of the brew basket 18; (3) prevent or reduce the amount of heated water that flows around the filter pack 66 and through the opening 38 without saturating the coffee grounds 110; (4) increase the amount of heated water that saturates the coffee grounds 110; and/or (5) affect the quality of the brewed coffee.

Figure 14:
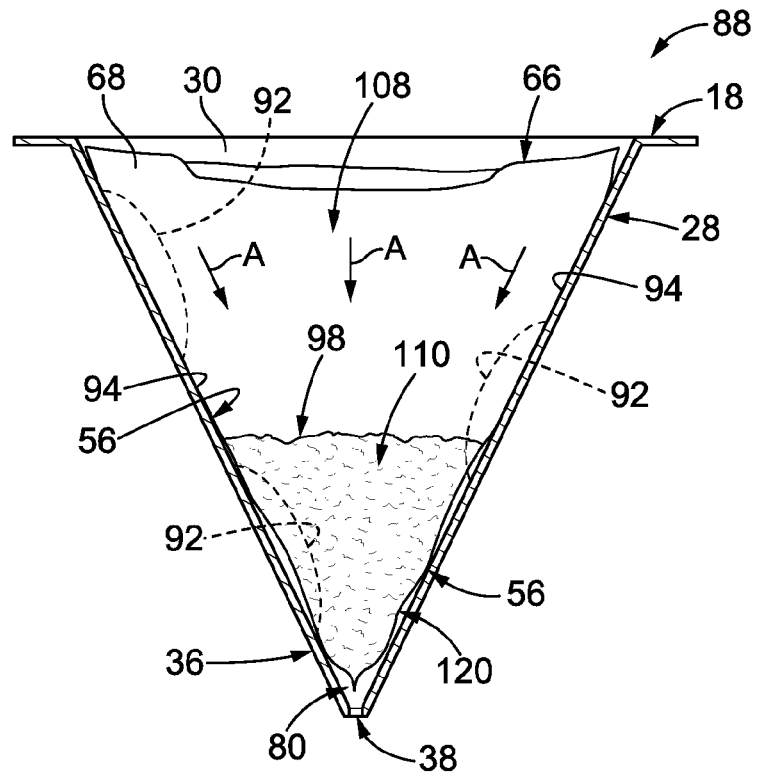
FIG. 14 is a cross-sectional view of the assembly shown in FIG. 13 taken along line 14-14 of FIG. 13.
Figure 15:
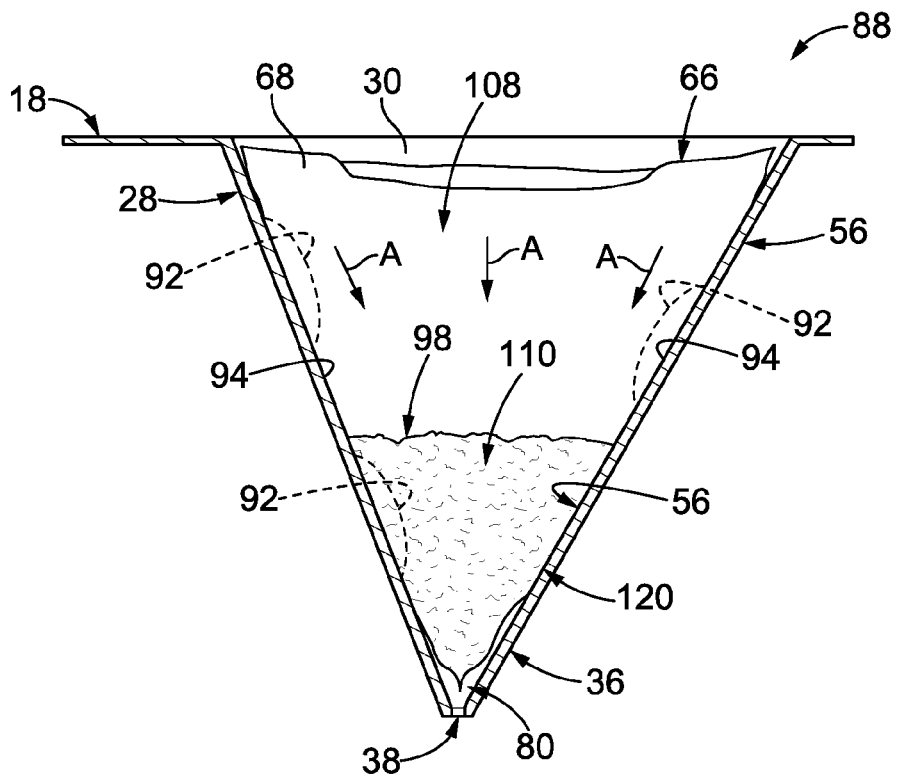
FIG. 15 is another cross-sectional view of the assembly shown in FIG. 13 taken along line 14-14 of FIG. 13.

FIGS. 14 and 15 are cross-sectional views of the assembly 88 taken along lines 14-14 and 15-15, respectively, of FIG. 13. FIGS. 14 and 15 illustrate the filter pack 66 held within the brewing reservoir 30 of the brew basket 18 after the brewing operation shown in FIG. 13 has been initiated. As described above, the internally tapered funnel shape of the multi-sided 3D shape of the brewing reservoir 30 directs the heated water dispensed from the brewing machine 10 (FIG. 1) downward (as indicated by the arrows A) through the pile 98 of the coffee grounds 110 of the filter pack 66 and out of the brewing reservoir 30 through the vertex 80 of the filter pack 66 and the opening 38 of the bottom end 36 of the brewing reservoir 30.

The filter pack 66 has a relatively tight fit within the brewing reservoir 30. For example, as described above, the multi-sided 3D shape and size of the filter pack 66 is complementary with the multi-sided 3D shape and size of the brewing reservoir 30. The complementary 3D shape and size of the filter pack 66 is such that the pouch 68 is configured to seal against the interior surface 94 of body 28 of the brew basket 18 during the brewing operation. For example, the complementary 3D shape and size of the filter pack 66 relative to the brewing reservoir 30 is configured to swell during the brewing operation such that the filter pack 66 fills the voids 92 that existed between the filter pack 66 and the body 28 of the brew basket 18 before the brewing operation was initiated. The voids 92 are shown in phantom in FIGS. 14 and 15 for clarity.

As used herein, a "seal" between the pouch 68 and the interior surface 94 of the body 28 is defined as preventing a predetermined amount (such as, but not limited to, at least approximately 70%, at least approximately 80%, at least approximately 90%, or an approximate entirety) of the heated water from flowing between the pouch 68 and the interior surface 94. In other words, a "seal" between the pouch 68 and the interior surface 94 of the body 28 is defined as directing a predetermined amount (such as, but not limited to, at least approximately 70%, at least approximately 80%, at least approximately 90%, or an approximate entirety) of the heated water into the internal chamber 108 of the filter pack 66 such that the predetermined amount of the heated water saturates the coffee grounds 110. The seal between the pouch 68 of the filter pack 66 and the interior surface 94 of the brew basket 18 may be created by the complementary shape and size of the filter pack 66 relative to the brewing reservoir 30, the pooling of the heated water on the closed top 90 of the filter pack described above, and/or by substantially filling the funnel-shaped segment 56 of the brewing reservoir 30 with the funnel-shaped segment 120 of the filter pack 66 as is described above.

The seal between the pouch 68 of the filter pack 66 and the interior surface 94 of the body 28 of the brew basket 18 may: facilitate preventing or reducing the amount of heated water that flows around the pouch 68 of the filter pack 66 and through the opening 38 without saturating the coffee grounds 110; and/or facilitate increasing the amount of heated water that saturates the coffee grounds 110. The seal between the pouch 68 of the filter pack 66 and the interior surface 94 of the body 28 of the brew basket 18 therefore may affect the quality of the brewed coffee, for example by increasing the strength of the brewed coffee and/or by increasing the extraction yield of the brewed coffee.

The strength (e.g., the predetermined amounts described above) of the seal between the pouch 68 of the filter pack 66 and the interior surface 94 of the body 28 of the brew basket 18 may be selected to: (1) prevent or reduce the amount of heated water that flows around the pouch 68 of the filter pack 66 and through the opening 38 without saturating the coffee grounds 110; (2) increase the amount of heated water that saturates the coffee grounds 110; and/or (3) affect the quality of the brewed coffee.

Optionally, the brew basket 18 may be used with a filter pack (not shown) that has a different shape than the shape of the brewing reservoir 30 of the brew basket 18. As one example, a separate component may be formed as an insert (not shown) that is configured to hold the differently shaped filter pack within the brewing reservoir 30. The insert may be provided with an exterior shape that is complementary with the multi-sided 3D shape of the brewing reservoir 30, while the insert is provided with an interior shape that is complementary with the differently shaped filter pack (e.g., a non-3D shape). For example, the exterior shape of the insert may have a multi-sided 3D shape of a triangular pyramid that is complementary with the triangular pyramidal shape of the illustrated embodiment of the brewing reservoir 30, while the interior shape of the insert has a different shape that is complementary with a filter pack having a cross-sectional shape defined by two side edges (i.e., a shape defined by three sides), a different triangular cross-sectional shape than the brewing reservoir 30, a different tetrahedral shape than the brewing reservoir 30, a rectangular cross-sectional shape (i.e., a shape defined by five sides), a square cross-sectional shape (i.e., a shape defined by five equilateral sides), an octagonal cross-sectional shape (i.e., a shape defined by six sides), a shape defined by at least five sides sidewalls, a shape defined by at least six sides, a more 2D shape (e.g., a relatively flat and/or thin shape, a puck shape, and/or the like), and/or the like. The insert may enable the brew basket 18 to be used with a filter pack that has a different shape than the brewing reservoir 30 in a manner that provides the same brewing results and/or performance as one or more of the other embodiments described and/or illustrated herein.

FIG. 16 is a table 200 illustrating experimental results of brewing coffee using the assembly 88 (FIGS. 10-15) of the brew basket 18 (FIGS. 1-5 and 10-15) and the filter pack 66 (FIGS. 6-15). The table 200 includes a plurality of test brews 202a, 202b, 202c, 202d, and 202e. Each test brew 202 is labeled with the particular coffee blend, the amount (in grams [g]) of the coffee grounds 110, and the type of water used in each brew test 202. "P56" refers to a proprietary coffee blend. The experimental results of the table 200 were obtained using an open top coffee brewing machine.

For each test brew 202, the table 200 includes a plurality of brew parameters 204 that define the test brew 202. Specifically, the brew parameters 204 include a filter position parameter 204a, a filter dimension parameter 204b, and a paper density parameter 204c. The filter position parameter 204a indicates a size (in millimeters [mm]) of the width of the seam 114 of the filter pack 66. The filter position parameter 204a also indicates the orientation of the seam 114 within the brewing reservoir 30. Specifically, "seal up" indicates that the filter pack 66 is oriented within the brewing reservoir 30 such that the seam 114 (FIGS. 6-9) extends along the closed top 90 (FIGS. 10-15) of the filter pack 66. "Seal down" indicates that the filter pack 66 is oriented within the brewing reservoir 30 (FIGS. 1-5 and 10-15) such that the seam 114 faces one of the sidewalls 50, 52, or 54 (FIGS. 2-5) of the brew basket 18. The filter dimension parameter 204b indicates the 3D shape of the brew basket 18 as well as specific dimensions (in inches [in]) of the 3D shape of the brew basket 18. The paper density parameter 204c indicates the paper density (in grams per square meter [g/m²]) of the filter paper used to fabricate the pouch 68 (FIGS. 6-15) of the filter pack 66. Paper density is also commonly referred to as "grammage".

The brew parameters 204 include a net coffee weight parameter 204d, a grind size parameter 204e, a water input parameter 204f, and a water recovery parameter 204g. The net coffee weight parameter 204d indicates the net weight (in g) of the coffee grounds 110 used in each brew test 202. The grind size parameter 204e indicates the selected size (in microns [μ]) of the individual coffee grounds 110. The grind size parameter 204e may have an error of +/−50μ. The water input parameter 204f indicates the amount (in fluid ounces [oz]) of water that is dispensed into the brewing reservoir 30 for each brew test 202. The water recover parameter 204g indicates the amount (in oz) of water that is received by the coffee-receiving vessel 22 (FIG. 1) from the brewing reservoir 30. In other words, the water recovery parameter 204g indicates how much of the water that was dispensed into the brewing reservoir 30 is recovered (i.e., received) into the coffee-receiving vessel 22. The water recovery parameter 204g thus gives information as to how much of the water dispensed into the brewing reservoir 20 was lost (i.e., remains within the filter pack 66 and/or the brewing reservoir 30) to the brewing process.

The brew parameters 204 include a brew time parameter 204i, a first brew temperature parameter 204j, and a second brew temperature parameter 204k. The brew time parameter 204i indicates the duration of time (in minutes [min]) of the brewing operation of each brew test 202. The first brew temperature parameter 204j indicates the temperature (in degrees Fahrenheit [° F.]) of the heated water dispensed from the nozzle 102 of the brewing machine 10 into the brewing reservoir 30 for each brew test 202. The second brew temperature parameter 204k indicates the temperature (in ° F.) of the brewed coffee that is received into the coffee-receiving vessel 22 for each brew test 202.

The brew parameters 204 also include an opening size parameter 204l and a comment parameter 204m for each test brew 202. The opening size parameter 204l indicates the size (in mm) of the opening 38 (FIGS. 2-5 and 10-15) of the bottom end 36 (FIGS. 2-5 and 10-15) of the brew basket. The comment parameter 204m provides comments on each brew test 202. "Good sag" refers to a relatively good formation of the pool 106 (FIG. 13) of water on the closed top 90 of the filter pack 66. "V. Good sag" refers to a larger pool 106 than "Good sag". "Spout in Center" refers to the nozzle 102 of the brewing machine 10 being configured to direct the heated water onto an approximate center of the closed top 90 of the filter pack 66.

For each test brew 202, the table 200 includes a plurality of brew results 206. Specifically, the brew results 206 include a first TDS result 206a, a second TDS result 206b, a third TDS result 206c, and an average TDS result 206d. The first, second, and third TDS results 206a, 206b, and 206c, respectively, represent TDS (i.e., the amount of TDS per unit of heated water within the brewed coffee) measurements (in parts per million [ppm]) at different times after the brewed coffee has been dispensed into the coffee-receiving vessel. The average TDS result 206d is an average of the first TDS result 206a, the second TDS result 206b, and the third TDS result 206c. The TDS results 206a, 206b, and 206c were obtained using a refractometer.

The TDS results 206a, 206b, 206c, and 206d represent the level of extraction of the brewed coffee. As can be seen from the table 200, the TDS values of the TDS results 206a, 206b, 206c, and 206d vary between approximately 998 ppm and approximately 1211 ppm for the various brew tests 202.

Figure 17:
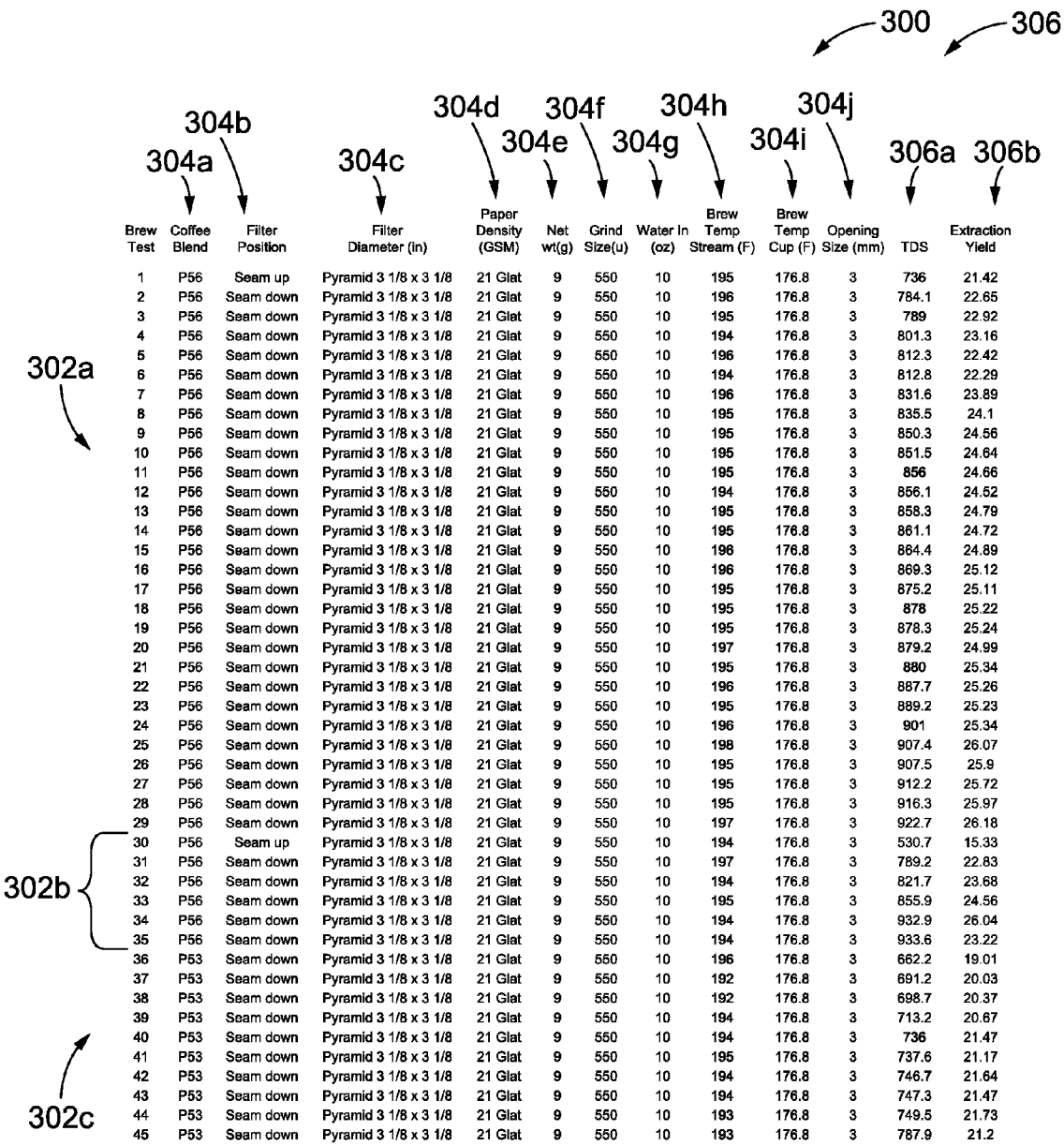
FIG. 17 is a table illustrating more experimental results of brewing coffee using the assembly of the brew basket and the filter pack shown in FIGS. 10-15.

FIG. 17 is a table 300 illustrating more experimental results of brewing coffee using the assembly 88 (FIGS. 10-15) of the brew basket 18 (FIGS. 1-5 and 10-15) and the filter pack 66 (FIGS. 6-15). The table 300 includes a plurality of sets of test brews 302, namely test brew sets 302a, 302b, and 302c. The test brew set 302a includes 29 test brews, which are labeled as test brews #1-29 in the table 300. The test brew set 302b includes six test brews (labeled as test brews #30-35 in table 300), and the test brew set 302c includes ten test brews (labeled as test brews #36-45 in table 300). The experimental results of the table 300 were obtained using a closed top coffee brewing machine.

For each brew test within each test brew set 302, the table 300 includes a plurality of brew parameters 304 that define the test brew. Specifically, the brew parameters 304 include a coffee blend parameter 304a, a filter position parameter 304b, a filter dimension parameter 304c, and a paper density parameter 304d. The coffee blend parameter 304a indicates the particular type of coffee blend used for the test brew. "P56" refers to the same proprietary coffee blend used in the table 200 of FIG. 16. "P53" refers to another proprietary coffee blend. It should be appreciated that the experimental results of the table 300 of FIG. 17 were obtained using two different blends of coffee. The filter position parameter 304b indicates the orientation of the seam 114 within the brewing reservoir 30. "Seam up" indicates that the filter pack 66 is oriented within the brewing reservoir 30 such that the seam 114 (FIGS. 6-9) extends along the closed top 90 (FIGS. 10-15) of the filter pack 66. "Seam down" indicates that the filter pack 66 is oriented within the brewing reservoir 30 such that the seam 114 faces one of the sidewalls 50, 52, or 54 (FIGS. 2-5) of the brew basket 18. The filter dimension parameter 304c indicates the 3D shape of the brew basket 18 as well as specific dimensions (in inches [in]) of the 3D shape of the brew basket 18. The paper density parameter 304d indicates the paper density (in grams per square meter [g/m²]) of the filter paper used to fabricate the pouch 68 (FIGS. 6-15) of the filter pack 66.

The brew parameters 304 include a net coffee weight parameter 304e, a grind size parameter 304f, and a water input parameter 304g. The net coffee weight parameter 304e indicates the net weight (in g) of the coffee grounds 110 used in each brew test. The grind size parameter 304f indicates the selected size (in microns [g]) of the individual coffee grounds 110. The grind size parameter 304f may have an error of +/−50μ. The water input parameter 304g indicates the amount (in fluid ounces [oz]) of water that is dispensed into the brewing reservoir 30 for each brew test.

The brew parameters 304 include a first brew temperature parameter 304h and a second brew temperature parameter 304i. The first brew temperature parameter 304H indicates the temperature (in degrees Fahrenheit [° F.]) of the heated water dispensed from the nozzle 102 of the brewing machine 10 into the brewing reservoir 30 (FIGS. 1-5 and 10-15) for each brew test. The second brew temperature parameter 304I indicates the temperature (in ° F.) of the brewed coffee that is received into the coffee-receiving vessel 22 for each brew test.

The brew parameters 304 also include an opening size parameter 304*j* for each test brew. The opening size parameter 304*j* indicates the size (in mm) of the opening 38 (FIGS. 2-5 and 10-15) of the bottom end 36 (FIGS. 2-5 and 10-15) of the brew basket.

For each brew test set 302*a*, 302*b*, and 302*c*, the table 300 includes a plurality of brew results 306. Specifically, as can be seen in the table 300 of FIG. 17, each test brew of each test brew test set 302 includes a TDS result 306*a* and an extraction yield result 306*b*. Each TDS result 306*a* represents a TDS (i.e., the amount of TDS per unit of heated water within the brewed coffee) measurement (in parts per million [ppm]) after the brewed coffee has been dispensed into the coffee-receiving vessel. The TDS results 206*a*, 206*b*, and 206*c* were obtained using an oven bake method. Each extraction yield result 306*b* represents the extraction yield (i.e., the amount of coffee ground soluables that have moved from the filter pack 66 to the brewed coffee) of the brewed coffee.

As can be seen from the table 300, the TDS values of the TDS results 306*a* for the test brew set 302*a* vary between 736.00 ppm and 922.70 ppm, the TDS values of the TDS results 306*a* for the test brew set 302*b* vary between 530.70 ppm and 933.60 ppm, and the TDS values of the TDS results 306*a* of the test brew set 302*c* vary between 662.20 ppm and 787.90 ppm. As indicated in the comment parameters 304*b*, the TDS results 306*a* of 736.00 ppm for test brew #1 in the test brew set 302*a* and 530.70 ppm for test brew #30 in the test brew set 302*b* were obtained using a seam up configuration of the filter pack 66, while all other TDS results 306*a* for each of the test brew sets 302*a*, 302*b*, and 302*c* were obtained using a seam down configuration of the filter pack 66. The difference in the values of the TDS results 306*a* as compared to the values of the TDS results 206 in the table 200 of FIG. 16 can be explained by the different methodology (i.e., using a refractometer vs. the oven bake method) used to obtain the experimental results of the tables 200 and 300.

The extraction yield values of the extraction yield results 306*b* for the test brew set 302*a* vary between 21.42% and 26.18%, the extraction yield values of the extraction yield results 306*b* for the test brew set 302*b* vary between 15.33% and 26.04%, and the extraction yield values of the extraction yield results for the test brew set 302*c* vary between 19.01% and 22.20%. As indicated in the comment parameters 304*b*, the extraction yield results 306*b* of 21.42% for test brew #1 in the test brew set 302*a* and 15.33% for test brew #30 in the test brew set 302*b* were obtained using a seam up configuration of the filter pack 66, while all other extraction yield results 306*b* for each of the test brew sets 302*a*, 302*b*, and 302*c* were obtained using a seam down configuration of the filter pack 66.

The brewing results of brewing coffee using the various embodiments of the brew baskets (e.g., the brew basket 18), filter packs (e.g., the filter pack 66), and/or filters (e.g., the filter 966 shown in FIG. 21) described and/or illustrated herein are highly repeatable with very limited variance due in part to the shapes and proportional dimensions maintained between parameters such as, but not limited to, the height, width, volume, pitch of the side walls, and/or the like. The brewing results are repeatable over multiple brewing operations by maintaining various environmental and equipment parameters approximately constant (or within a predetermined tolerance) across the multiple brewing operations. Examples of such environmental parameters that may be maintained approximately constant (or within a predetermined tolerance) across the multiple brewing operations include, but are not limited to: (1) a ratio of the amount of coffee grounds to the amount of water used in the brewing operations (commonly referred to as "dosing"); (2) a temperature of the heated water; (3) a duration of time that any single unit of the heated water is in physical contact with the coffee grounds; and (4) a particular type, grind, and/or blend of coffee. Other environmental parameters, that affect extraction, bitterness, TDS, and/or the like, may be held substantially constant.

By "repeatable", it is meant that the brewing results of multiple brewing operations fall within a predetermined variance relative to each other when the environmental parameters are maintained within the predetermined tolerance range. Specifically, the brewing results after multiple brewing operations performed using any select embodiment of the brew baskets, filter packs, and/or filters described and/or illustrated herein, are repeatable within a predetermined variance of each other by maintaining various environmental parameters approximately constant (or within a predetermined tolerance) across the multiple brewing operations. Examples of the repeatability of the brewing results obtained using an embodiment of the brew basket, filter pack, and/or coffee described and/or illustrated herein include, but are not limited to, brewing results (e.g., TDS) having a predetermined preferred variance within approximately 5% of each other, more generally within approximately 10% of each other, more generally within approximately 17.5% of each other or even more generally within approximately 25% of each other.

The characteristics that are repeatable may include, but are not limited to, the TDS of the brewed coffee, the extraction yield of the brewed coffee, and/or the like. For example, the TDS of the brewed coffee may be repeatable within a predetermined preferred variance of approximately 5%, or more generally approximately 10%, or even more generally approximately 25% over multiple brewing operations performed while maintaining constant the environmental and equipment parameters, such as, but not limited to, the shape and size of the brew basket and filter pack described and/or illustrated herein.

The brew tests 202*a*, 202*b*, and 202*c* of FIG. 16 illustrate one example of the repeatability of TDS across multiple brewing operations performed using the same brew basket and filter pack shape and size. Specifically, the lowest TDS of the brewed coffee of the brew tests 202*a*, 202*b*, and 202*c* is 1149 ppm and the highest is 1177 ppm. Accordingly, the TDS of the brewed coffee has a variance of approximately 2.4% across the brew tests 202*a*, 202*b*, and 202*c*.

The test brew sets 302*a*, 302*b*, and 302*c* of FIG. 17 illustrate another example of the repeatability of TDS across multiple brewing operations performed using the same brew basket and filter pack shape and size. Specifically, ignoring the TDS result 306*a* for test brew #1 of the test brew set 302*a* (because of the seam up configuration), the lowest TDS result of the brewed coffee of the test brew set 302*a* is 784.10 ppm and the highest is 922.70 ppm. Accordingly, the TDS of the brewed coffee has a variance of approximately 15.0% across the brew tests of the test brew set 302*a*. Ignoring the TDS result 306*a* for test brew #30 of the test brew set 302*b* (because of the seam up configuration), the lowest TDS result of the brewed coffee of the test brew set 302*b* is 789.20 ppm and the highest is 933.60 ppm. Accordingly, the TDS of the brewed coffee has a variance of approximately 15.5% across the brew tests of the test brew set 302*b*. The lowest TDS result of the brewed coffee of the test brew set 302*c* is 662.20 ppm and the highest is 787.90 ppm. Accordingly, the TDS of the brewed coffee has a variance of approximately 16.0% across the brew tests of the test brew set 302*c*. Notably, the TDS results 306*a* were obtained using a different coffee blend for the test brew set 302*b* as compared to the test brew sets 302*a* and 302*c*.

A predetermined preferred variance of the extraction yield of the brewed coffee is approximately 5% over multiple brewing operations performed when the environmental parameters are maintained approximately constant (or within a predetermined tolerance) and the same brew basket and the same filter pack shape and size are used across the brewing operations. More generally, the extraction yield of the brewed coffee may be repeatable within a predetermined variance of approximately 10% over multiple brewing operations, or may be repeatable within a predetermined variance of approximately 17.5% over multiple brewing operations. Even more generally, the extraction yield of the brewed coffee is repeatable within a predetermined variance of approximately 25%.

The test brew sets 302*a*, 302*b*, and 302*c* of FIG. 17 illustrate one example of the repeatability of the extraction yield of the brewed coffee across multiple brewing operations performed using the same brew basket and filter pack shape and size. Specifically, ignoring the extraction yield result 306*b* for test brew #1 of the test brew set 302*a* (because of the seam up configuration), the lowest extraction yield result of the brewed coffee of the test brew set 302*a* is 22.65% and the highest is 26.18%. Accordingly, the extraction yield of the brewed coffee has a variance of approximately 13.5% across the brew tests of the test brew set 302*a*. Ignoring the extraction yield result 306*b* for test brew #30 of the test brew set 302*b* (because of the seam up configuration), the lowest extraction yield result of the brewed coffee of the test brew set 302*b* is 22.83% and the highest is 26.04%. Accordingly, the extraction yield of the brewed coffee has a variance of approximately 12.3% across the brew tests of the test brew set 302*b*. The lowest extraction yield result of the brewed coffee of the test brew set 302*c* is 19.01% and the highest is 22.20%. Accordingly, the extraction yield of the brewed coffee has a variance of approximately 14.4% across the brew tests of the test brew set 302*c*. Notably, the extraction yield results 306*b* were obtained using a different coffee blend for the test brew set 302*b* as compared to the test brew sets 302*a* and 302*c*.

While not shown, pH results of the brewed coffee may represent the acidity of the brewed coffee, which may manifest in the bitterness of the taste of the coffee. The pH of the brewed coffee is dependent solely on the pH of the water used to brew the coffee. The pH of the brewed coffee may be repeatable by controlling the pH used to brew the coffee.

Any select embodiment of the brew baskets, filter packs, and/or filters described and/or illustrated herein may be configured to achieve a predetermined extraction yield (or a predetermined range of extraction yield). For example, coffee grounds contain a predetermined total available solids (i.e., the total solids capacity of a fixed amount of coffee grounds). The extraction yield can be expressed as a percentage of the predetermined total available solids. Any select embodiment of the brewing reservoirs (e.g., the brewing reservoir 30) described and/or illustrated herein can be configured such that the heated water flows through the coffee grounds until accumulating at least 14% of the predetermined total available solids available within the coffee grounds. In some embodiments, the heated water flows through the coffee grounds until accumulating between approximately 14% and approximately 27% of the predetermined total available solids available within the coffee grounds. In some embodiments, the heated water flows through the coffee grounds until accumulating between approximately 18% and approximately 22% of the predetermined total available solids available within the coffee grounds. As described above with respect to extraction yield generally, the percentage of the predetermined total available solids available within the coffee grounds that is accumulated by the heated water is highly repeatable with very limited variance.

Figure 18:
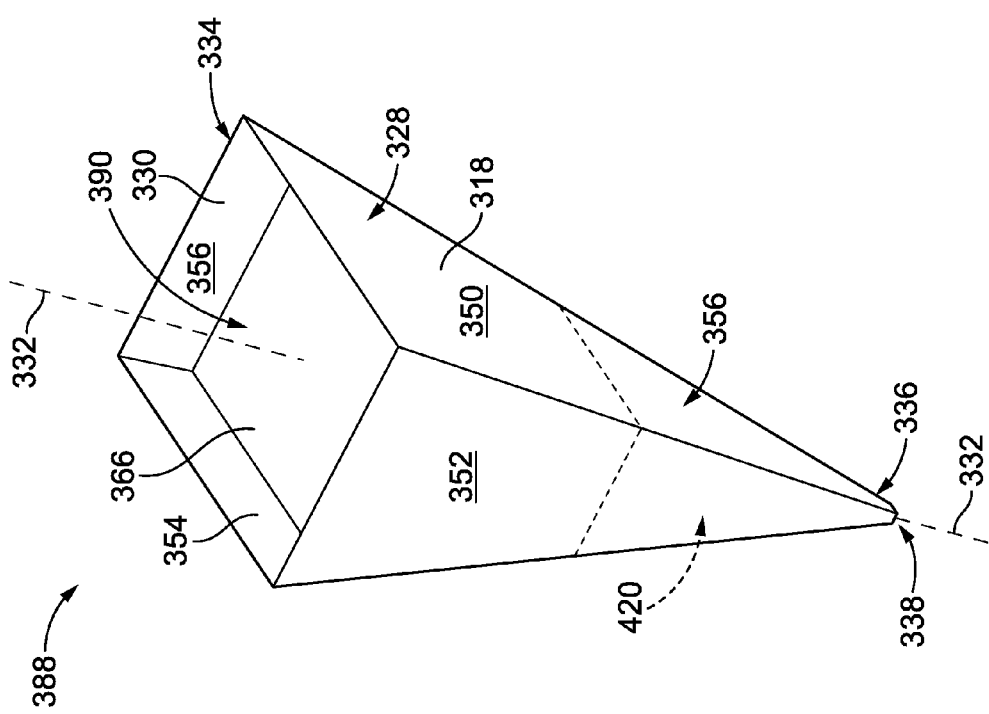
FIG. 18 is a perspective view of an assembly of another embodiment of a brew basket and another embodiment of a filter pack.

FIG. 18 is a perspective view of an assembly 388 of another embodiment of a brew basket 318 and another embodiment of a filter pack 366. The brew basket 318 may be used, for example, with the brewing machine 10 (FIG. 1). The brew basket 318 includes a body 328 that defines a brewing reservoir 330 for holding a complementary filter pack 366 of coffee grounds during a brewing operation. The body 328 of the brew basket 318 includes an internally tapered multi-sided three-dimensional (3D) shape that extends along a central longitudinal axis 332 from an open top 334 to a bottom end 336. The brewing reservoir 330 also includes an internally tapered multi-sided 3D shape that extends along the central longitudinal axis 332 from the open top 334 to the bottom end 336.

In the illustrated embodiment, the multi-sided 3D shape of the brewing reservoir 330 has a rectangular shape. The body 328 includes four sidewalls 350, 352, 354, and 356 that extend from the open top 334 to one or more openings 338 of the bottom end 336. The illustrated embodiment of the brewing reservoir 330 includes a square cross-sectional shape taken along a plane that extends approximately perpendicular to the central longitudinal axis 332. But, the brewing reservoir 330 may include other rectangular shapes.

The filter pack 366 has a generally tapered multi-sided 3D shape and size that is substantially similar and complementary with the multi-sided 3D shape of the brewing reservoir 330 such that, for example, the filter pack 366 has a relatively tight fit within the brewing reservoir 330.

Optionally, the filter pack 366 is held within the brewing reservoir 330 such that a funnel-shaped segment 420 of the filter pack 366 substantially fills a funnel-shaped segment 356 of the brewing reservoir 330. Heated water dispensed from the brewing machine is optionally configured to pool on a closed top 390 of the filter pack 366. The filter pack 366 is optionally configured to seal against the body 328 of the brew basket 318 during a brewing operation.

Figure 19:
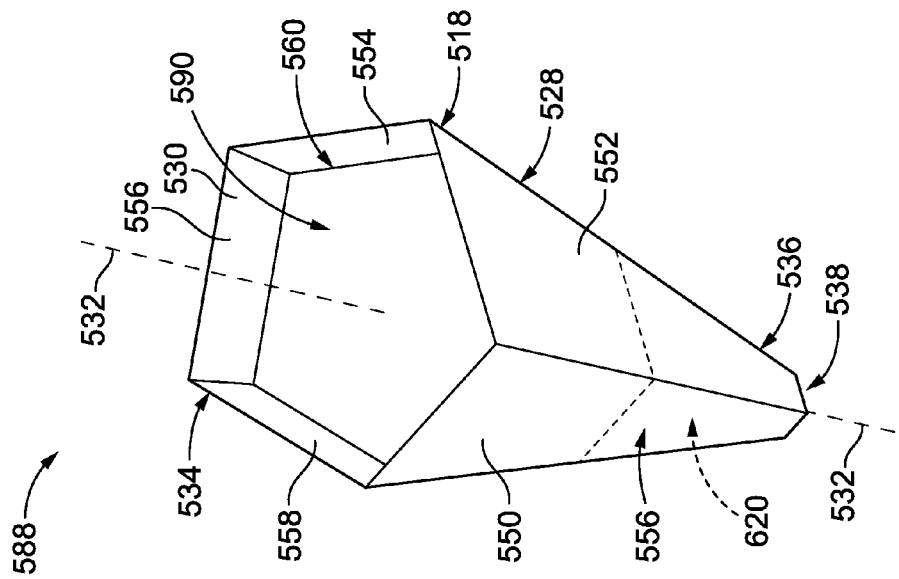
FIG. 19 is a perspective view of an assembly of another embodiment of a brew basket and another embodiment of a filter pack.

FIG. 19 is a perspective view of an assembly 588 of another embodiment of a brew basket 518 and another embodiment of a filter pack 566. The brew basket 518 may be used, for example, with the brewing machine 10 (FIG. 1). The brew basket 518 includes a body 528 that defines a brewing reservoir 530 for holding a complementary filter pack 566 of coffee grounds during a brewing operation. The body 528 of the brew basket 518 includes an internally tapered multi-sided three-dimensional (3D) shape that extends along a central longitudinal axis 532 from an open top 534 to a bottom end 536. The brewing reservoir 530 also includes an internally tapered multi-sided 3D shape that extends along the central longitudinal axis 532 from the open top 534 to the bottom end 536.

In the illustrated embodiment, the multi-sided 3D shape of the brewing reservoir 530 has a five-sided shape that includes the cross-sectional shape of an octagon. The body 528 includes five sidewalls 550, 552, 554, 556, and 558 that extend from the open top 534 to one or more openings 538 of the bottom end 536. The illustrated embodiment of the brewing reservoir 530 includes an octagonal cross-sectional shape taken along a plane that extends approximately perpendicular to the central longitudinal axis 532.

The filter pack 566 has a generally tapered multi-sided 3D shape and size that is substantially similar and complementary with the multi-sided 3D shape of the brewing reservoir 530 such that, for example, the filter pack 566 has a relatively tight fit within the brewing reservoir 530.

Optionally, the filter pack 566 is held within the brewing reservoir 530 such that a funnel-shaped segment 620 of the filter pack 566 substantially fills a funnel-shaped segment 556 of the brewing reservoir 530. Heated water dispensed from the brewing machine is optionally configured to pool on a closed top 590 of the filter pack 566. The filter pack 566 is optionally configured to seal against the body 528 of the brew basket 518 during a brewing operation.

Figure 20:
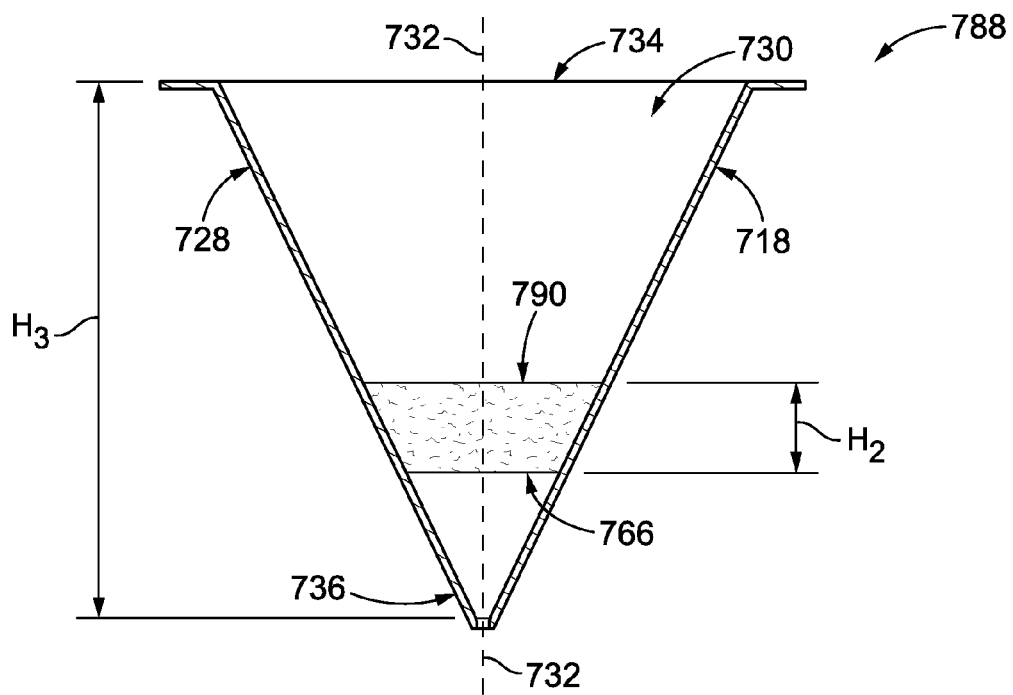
FIG. 20 is a perspective view of an assembly of another embodiment of a brew basket and another embodiment of a filter pack.

FIG. 20 is a perspective view of an assembly 788 of another embodiment of a brew basket 718 and another embodiment of a filter pack 766. The brew basket 718 may be used, for example, with the brewing machine 10 (FIG. 1). The brew basket 718 includes a body 728 that defines a brewing reservoir 730 for holding a complementary filter pack 766 of coffee grounds during a brewing operation. The body 728 of the brew basket 718 includes an internally tapered multi-sided three-dimensional (3D) shape that extends along a central longitudinal axis 732 from an open top 734 to a bottom end 736. The brewing reservoir 730 also includes an internally tapered multi-sided 3D shape that extends along the central longitudinal axis 732 from the open top 734 to the bottom end 736.

The 3D shape of the body 728 of the brew basket 718 may have any shape, such as, but not limited to, a triangular pyramid shape, a conical shape (i.e., a circular cross-sectional shape), a different triangular cross-sectional shape, an oval cross-sectional shape, a rectangular cross-sectional shape (i.e., a shape defined by four sidewalls), a square cross-sectional shape (i.e., a shape defined by four equilateral sidewalls), an octagonal cross-sectional shape (i.e., a shape defined by five sidewalls), a shape defined by at least four sidewalls, a shape defined by at least five sidewalls, and/or the like.

The filter pack 766 has a size and shape that is substantially similar and complementary with the multi-sided 3D shape of the brewing reservoir 730 such that, for example, the filter pack 766 has a relatively tight fit within the brewing reservoir 730. For example, the filter pack 766 includes a two-dimensional (2D) shape and size (taken along a plane that extends approximately perpendicular to the central longitudinal axis 732) that is complementary with the cross-sectional shape and size (taken along a plane that extends approximately perpendicular to the central longitudinal axis 732) of the brewing reservoir 730 of the brew basket 718. The filter pack 766 may have a height $H_2$ of any value, which may have any relation to a height $H_3$ of the brewing reservoir 730. In some embodiments, the height $H_2$ of the filter pack 766 is less than approximately 25%, less than approximately 15%, or less than approximately 10% of the height $H_3$ of the brewing reservoir 730.

Heated water dispensed from the brewing machine is optionally configured to pool on a closed top 790 of the filter pack 766. The filter pack 766 is optionally configured to seal against the body 728 of the brew basket 718 during a brewing operation.

Figure 21:
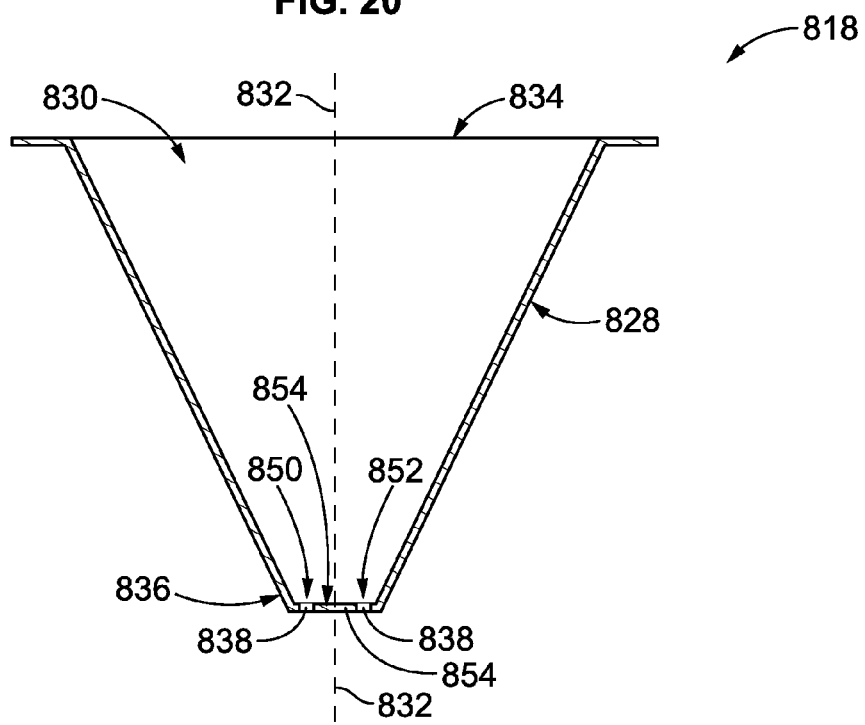
FIG. 21 is a cross-sectional view of another embodiment of a brew basket.

FIG. 21 is a cross-sectional view of another embodiment of a brew basket 818 illustrating an alternative embodiment of the opening 38 (FIGS. 2-5 and 10-15) of the bottom end 36 (FIGS. 2-5 and 10-15) of the brewing reservoir 30 (FIGS. 1-5 and 10-15). The brew basket 818 may be used, for example, with the brewing machine 10 (FIG. 1). The brew basket 818 includes a body 828 that defines a brewing reservoir 830 for holding a complementary filter pack (not shown; e.g., the filter pack 66 shown in FIGS. 6-15) of coffee grounds during a brewing operation. The body 828 of the brew basket 818 includes an internally tapered multi-sided three-dimensional (3D) shape that extends along a central longitudinal axis 832 from an open top 834 to a bottom end 836. The brewing reservoir 830 also includes an internally tapered multi-sided 3D shape that extends along the central longitudinal axis 832 from the open top 834 to the bottom end 836.

The bottom end 836 of the brewing reservoir 830 includes one or more openings 838 that extend through the body 828 to permit brewed coffee to flow from the brewing reservoir 830 of the brew basket 818 into a coffee-receiving vessel (e.g., the coffee-receiving vessel 22 shown in FIG. 1. The opening(s) 838 may be commonly referred to as a "drip spout".

The illustrated embodiment of the brew basket 818 includes two openings 838. But, the brew basket 818 may include any number of the openings 838, each of which may have any size and any shape. As can be seen in FIG. 21, the openings 838 each extend at a respective side 850 and 852 of the bottom end 836 of the brewing reservoir 830 with a ledge 854 extending between the openings 838.

Figure 22:
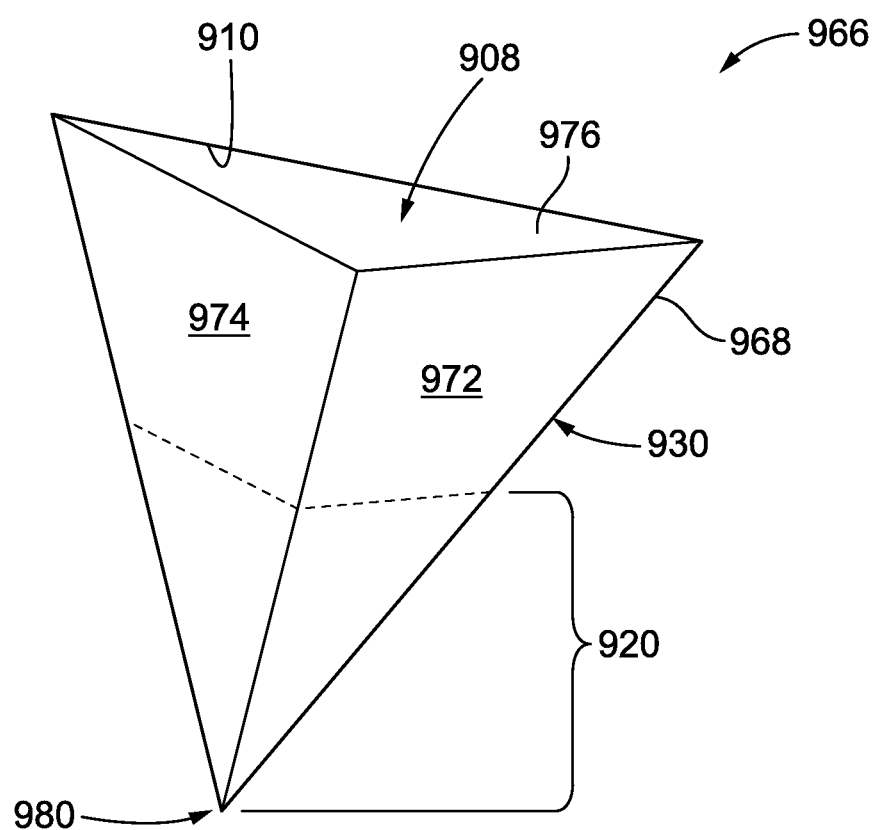
FIG. 22 is a perspective view of an embodiment of a filter for use with the brew basket shown in FIGS. 2-5 in place of the filter pack shown in FIGS. 6-9.

FIG. 22 is a perspective view of an embodiment of a filter 966 for use with the brew basket 18 (FIGS. 1-5 and 10-15 in place of the filter pack 66 (FIGS. 6-15). The filter 966 includes a liquid permeable body 968 that is configured to hold coffee grounds. Specifically, the body 968 includes a reservoir 908 within which the coffee grounds are contained. The body 968 of the filter 966 is configured to be held within the brewing reservoir 30 (FIGS. 1-5 and 10-15) of the brew basket 18 for receiving heated water from the brewing machine 10 (FIG. 1) during a brewing operation. During the brewing operation, the heated water saturates the coffee grounds contained within the filter 966 and thereby brews coffee.

The body 968 of the filter 966 includes a generally tapered multi-sided 3D shape and size that is substantially similar to and complementary with the 3D shape and size of the brewing reservoir 30 of the brew basket 18. Specifically, the body 968 includes a generally tapered multi-sided 3D shape that extends a height from an open top 910 to a vertex 980 of the multi-sided 3D shape. In the illustrated embodiment, the multi-sided 3D shape of the body 968 of the filter 966 constitutes a tetrahedral shape, and more specifically a triangular pyramid. Specifically, the body 968 includes three sides 972, 974, and 976 and the open top 910, which are each shaped as equilateral triangles having approximately the same size as each other. The sides 972, 974, and 976 and the open top 910 are arranged in the illustrated triangular pyramid shape, which includes the vertex 980 at which the sides 972, 974, and 976 intersect.

As described above, the multi-sided 3D shape of the body 968 of the filter 966 is generally tapered. Specifically, the multi-sided 3D shape of the body 968 is tapered from the open top 910 to the vertex 980. Optionally, the multi-sided 3D shape of the body 968 is continuously tapered from the open top 910 to the vertex 980. Optionally, the amount of taper of the body 968 is substantially even from the open top 910 to the vertex 980.

The filter 966 is configured to be held within the brewing reservoir 30 such that the vertex 980 is inverted within the brewing reservoir 30 and such that the open top 910 faces upward toward the open top 34 (FIGS. 2-5 and 10-15) and/or is located proximate the open top 34 of the brewing reservoir 30. As shown in FIG. 22, the multi-sided 3D shape of the body 968 includes a funnel shaped segment 920 positioned proximate the vertex 980. The filter 966 is configured to be received within the brewing reservoir 30 such that the coffee grounds fill the funnel-shaped segment 920, for example to facilitate extraction from the coffee grounds. The funnel-shaped segment 920 has a volume that is configured to hold the coffee grounds. The body 968 of the filter 966 includes a head space 930 that extends between the funnel-shaped segment 920 and the open top 910. The head space 930 is configured to extend within the head segment 128 (FIGS. 11 and 12) of the brewing reservoir 30 when the body 968 is received within the brewing reservoir 30 with the funnel-shaped segment 920 received within the funnel-shaped segment 56 (FIGS. 2-5, 11, 12, 14, and 15) of the brewing reservoir 30, for example to facilitate extraction from the coffee grounds.

To brew coffee using the filter 966, the body 968 of the filter 966 is loaded into the brewing reservoir 30 of the brew basket 18 such that the vertex 980 is inverted within the brewing reservoir 30 and such that the open top 910 faces upward toward the open top 34 and/or is located proximate the open top 34 of the brewing reservoir 30. When the filter 966 is loaded into the brewing reservoir 30 as such, the funnel-shaped segment 920 of the filter 966 is received within the funnel-shaped segment 56 of the brewing reservoir 30. The coffee grounds can then be loaded into the reservoir 908 of the filter 966 by a user of the brewing machine 10. In addition or alternatively, the coffee grounds can be loaded into the reservoir 908 of the filter 966 before (and/or simultaneously as) the filter 966 is loaded into the brewing reservoir 30. As described above, the coffee grounds fill the funnel-shaped segment 920, for example to facilitate extraction from the coffee grounds.

The multi-sided 3D shape of the body 968 of the filter 966 may be continuously tapered by any amount of taper. For example, the reservoir 908 may have any volume, the funnel-shaped segment 920 may have any volume, and the head space 930 may have any volume. Selection of the volume of the reservoir 908, the volume of the funnel-shaped segment 920, and/or the volume of the head space 930 may be selected to: (1) increase the turbulence of heated water moving through the brewing reservoir 30; (2) create a seal between the filter 966 and the body 28 of the brew basket 18; (3) prevent or reduce the amount of heated water that flows around the body 968 of the filter 966 and through the opening 38 (FIGS. 2-5, 11, 12, 14, and 15) without saturating the coffee grounds; (4) increase the amount of heated water that saturates the coffee grounds; and/or (5) affect the quality of the brewed coffee.

The multi-sided 3D shape of the body 968 of the filter pack 966 is not limited to the triangular pyramid shape of the illustrated embodiment of the filter 966, but rather may additionally or alternatively include any other shape that is complementary with the brew basket 18. In other words, in addition or alternatively to the triangular pyramid shape, the multi-sided 3D shape of the filter 966 may include any other shape that is defined by any number of sides greater than two, such as, but not limited to, a cross-sectional shape defined by two side edges (i.e., a shape defined by three sides), a different triangular cross-sectional shape, a different tetrahedral shape, a rectangular cross-sectional shape (i.e., a shape defined by five sides), a square cross-sectional shape (i.e., a shape defined by five equilateral sides), an octagonal cross-sectional shape (i.e., a shape defined by six sides), a shape defined by at least five sides sidewalls, a shape defined by at least six sides, and/or the like.

In some embodiments, the body 968 of the filter 966 is configured to contain an amount of the coffee grounds appropriate for brewing a single serving of coffee, and is optionally designed to be used once (or for a limited number of uses) and then discarded. Alternatively, the body 968 of the filter 966 is configured to contain a sufficient amount of the coffee grounds to brew more than a single serving of coffee in a single brewing operation.

The body 968 of the filter 966 may be fabricated from any materials, such as, but not limited to, paper, a mesh, a metal, nylon, a natural material (e.g., a pulp, rice hulls, wheat chaff, sugar can pulp, wood, cellulose, and/or the like), and/or the like. The body 968 may have any porosity to provide the body 968 with any amount of liquid permeability.

As used herein, an element or step recited in the singular and proceeded with the word "a" or "an" should be understood as not excluding plural of said elements or steps, unless such exclusion is explicitly stated. Furthermore, references to "one embodiment" or "an embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A brew basket for use in a beverage brewing machine, the brew basket comprising:
    a body defining a brewing reservoir that extends along a longitudinal length from an open top to a bottom end having one or more openings, the brewing reservoir having a multi-sided three-dimensional (3D) funnel-shaped segment;
    the funnel-shaped segment located proximate to the one or more openings at the bottom end;

the open top being configured to receive heated water from the brewing machine during a brewing operation with brewed beverage discharging from the one or more openings; and the funnel-shaped segment of the brewing reservoir having a shape that is complimentary with a funnel-shaped segment of a liquid permeable pouch of a filter pack;

the funnel-shaped segment of the brewing reservoir configured to receive the funnel-shaped segment of the filter pack in a manner that creates a seal between the liquid permeable pouch and the brewing reservoir.

2. The brew basket of claim 1, wherein the brewing reservoir is continuously tapered from the open top, along at least one of a head segment or the funnel-shaped segment.

3. The brew basket of claim 1, wherein an amount of taper in sides of the brewing reservoir is substantially even from the open top to the one or more openings at the bottom end.

4. The brew basket of claim 1, wherein the funnel-shaped segment extends to the one or more openings at the bottom end.

5. The brew basket of claim 1, wherein the multi-sided 3D funnel-shaped segment of the brewing reservoir constitutes an open-sided tetrahedral shape.

6. The brew basket of claim 1, wherein the multi-sided 3D funnel-shaped segment of the brewing reservoir constitutes a triangular pyramid shape with the open top defining an open side of the triangular pyramid shape.

7. The brew basket of claim 1, wherein the brewing reservoir extends from the open top to the bottom end along a central longitudinal axis, the funnel-shaped segment of the brewing reservoir having a cross-sectional shape taken along a plane that extends approximately perpendicular to the central longitudinal axis, the cross-sectional shape of the funnel-shaped segment comprising at least one of a cross-sectional shape defined by two side edges, a triangular shape, a rectangular shape, a tetrahedral shape, a square shape, an octagonal shape, a shape having at least three sides, a shape having at least four sides, or a shape having at least five sides.

8. The brew basket of claim 1, wherein the complimentary shape of the funnel-shaped segment is configured to form the seal such that the heated water will accumulate at least a select amount of solids per unit of heated water before discharging from the one or more openings at the bottom end.

9. The brew basket of claim 1, wherein the complimentary shape of the funnel-shaped segment is configured to form the seal such that the heated water will accumulate at least 14% of a predetermined total available solids available within the coffee grounds before discharging from the one or more openings at the bottom end.

10. The brew basket of claim 1, wherein the body is formed with a disposable construction.

11. The brew basket of claim 1, wherein the brewing reservoir has a size dimensioned appropriate to brew approximately only a single serving of beverage during a brewing operation.

12. A filter pack for use in a beverage brewing machine having a brew basket that includes a brewing reservoir, the filter pack comprising:

a liquid permeable pouch containing coffee grounds, the pouch having multiple sides and multiple vertices joined to form at least two multi-sided three-dimensional (3D) funnel-shaped segments;

the pouch being configured to be held within the brewing reservoir of the brew basket, the funnel-shaped segments of the pouch having a shape and size complimentary with a funnel-shaped segment of the brewing reservoir, the funnel-shaped segments of the pouch forming a polygon configured to fit within and create a seal with the brewing reservoir when oriented in any of at least two inverted positions, wherein a different associated one of the funnel-shaped segments is located proximate to a bottom end of the brew basket when in each of the associated inverted positions; and the pouch being configured to receive heated water from the brewing machine at an uppermost one of the sides during a brewing operation with brewed beverage discharging from the inverted vertex.

13. The filter pack of claim 12, wherein the sides have an associated opposed vertex and the pouch is continuously tapered from each side to the associated opposed vertex.

14. The filter pack of claim 13, wherein an amount of taper is substantially even from each side to the associated opposed vertex.

15. The filter pack of claim 12, wherein the coffee grounds fill any one of the funnel-shaped segments when the filter pack is oriented with the associated vertex inverted.

16. The filter pack of claim 12, wherein the sides have an associated opposed vertex such that, when the pouch is positioned in the brewing reservoir with a first vertex inverted, a water pooling pocket will be formed proximate to an exterior surface of an associated opposed first side of the pouch during the brewing operation to facilitate extraction from the coffee grounds.

17. The filter pack of claim 12, wherein the pouch swells during the brewing operation such that the pouch and the coffee grounds fill voids between the pouch and a body of the brew basket to form the seal and to facilitate extraction from the coffee grounds.

18. The filter pack of claim 12, wherein the sides of the pouch have triangular shapes.

19. The filter pack of claim 12, wherein the funnel-shaped segments of the pouch have a tetrahedral shape.

20. The filter pack of claim 12, wherein the funnel-shaped segments of the pouch have a triangular pyramid shape.

21. The filter pack of claim 12, wherein the sides of the filter pack join to form a universal orientation such that the sides maintain the funnel-shaped segments shape and size of the pouch as complementary with the funnel-shaped segment shape and size of the brewing reservoir when the filter pack is oriented with any one of the vertices as inverted.

22. The filter pack of claim 12, wherein the pouch holds an amount of the coffee grounds that is configured to brew approximately only a single serving of beverage during the brewing operation.

23. A brew basket and filter pack assembly for use in a beverage brewing machine, the assembly comprising:

a brew basket comprising a body defining a brewing reservoir that extends along a longitudinal length from an open top to a bottom end having one or more openings, the brewing reservoir having a multi-sided three-dimensional (3D) funnel-shaped segment, the funnel-shaped segment located proximate to the one or more openings at the bottom end, the open top being configured to receive heated water from the brewing machine during a brewing operation with brewed beverage discharging from the one or more openings; and a filter pack comprising a liquid permeable pouch containing coffee grounds, the pouch having multiple sides and multiple vertices joined to form a multi-sided three-dimensional (3D) funnel-shaped segment, the pouch being configured to be held within the brewing reservoir of the brew basket, the funnel-shaped segment of the pouch having a shape and size complementary with a shape and size of the funnel-shaped segment of the brewing reservoir to create a seal between the filter pack and the brewing reservoir.

24. The assembly of claim 23, wherein the sides and vertices of the pouch of the filter pack form a polygon that fits within the brewing reservoir when oriented in any one of multiple inverted positions, wherein a different associated one of the vertices is inverted in each of the inverted positions.

25. The assembly of claim 23, wherein the brewing reservoir is continuously tapered from the open top to the bottom end.

26. The assembly of claim 23, wherein an amount of taper in sides of the brewing reservoir is substantially even from the open top to the one or more openings at the bottom end.

27. The assembly of claim 23, wherein the funnel-shaped segment is configured to channel heated water through coffee grounds in the filter pack before exiting through the one or more openings at the bottom end.

28. The assembly of claim 23, wherein the funnel-shaped segment of the brewing reservoir constitutes an open-sided tetrahedral shape.

29. The assembly of claim 23, wherein the funnel-shaped segment of the brewing reservoir constitutes a triangular pyramid shape with the open top defining an open side of the triangular pyramid shape.

30. The assembly of claim 23, wherein the funnel-shaped segment of the brewing reservoir has a cross-sectional shape taken along a plane that extends approximately perpendicular to a central longitudinal axis, the cross-sectional shape comprising at least one of a cross-sectional shape defined by two side edges, a triangular shape, a rectangular shape, a tetrahedral shape, a square shape, an octagonal shape, a shape having at least three sides, a shape having at least four sides, or a shape having at least five sides.

31. The assembly of claim 23, wherein filter pack and the brewing reservoir fit with one another such that the heated water flows through coffee grounds of the filter pack until accumulating at least a select amount of solids per unit of heated water before discharging from the one or more openings at the bottom end.

32. The assembly of claim 23, wherein filter pack and the brewing reservoir fit with one another such that the heated water will flow through the coffee grounds until accumulating at least 14% of the predetermined total available solids available within the coffee grounds before discharging from the one or more openings at the bottom end.

33. The assembly of claim 23, wherein the body is formed with a disposable construction.

34. The assembly of claim 23, wherein the brewing reservoir and filter pack have a size dimensioned appropriate to brew approximately only a single serving of beverage during a brewing operation.

35. The assembly of claim 23, wherein the sides of the pouch have an associated opposed vertex and the sides of the pouch are continuously tapered from each side to the associated opposed vertex.

36. The assembly of claim 23, wherein the sides of the pouch have an associated opposed vertex and the pouch is continuously tapered from each side to the associated opposed vertex, the amount of taper being substantially even from each side to the associated opposed vertex.

37. The assembly of claim 23, wherein the pouch includes multiple vertices and funnel-shaped segments proximate each of the vertices such that the coffee grounds fill any one of the funnel-shaped segments when the filter pack is oriented with the associated vertex inverted.

38. The assembly of claim 23, wherein the sides have an associated opposed vertex such that when the pouch is positioned in the brewing reservoir with a first vertex inverted, a water pooling pocket is to be formed proximate an exterior surface of an associated opposed first side of the pouch during the brewing operation.

39. The assembly of claim 23, wherein the pouch is configured to swell during the brewing operation such that the pouch and the coffee grounds fill voids between the pouch and a body of the brew basket.

40. The assembly of claim 23, wherein the sides of the pouch have triangular shapes.

41. The assembly of claim 23, wherein the multi-sided 3D shape of the pouch constitutes at least one of a tetrahedral shape or a triangular pyramid shape.

42. The assembly of claim 23, wherein the sides of the filter pack join to form a universal orientation such that the sides maintain multiple funnel-shaped segments that are complementary with the shape and size of the funnel-shaped segment of the brewing reservoir when the filter pack is oriented with any one of the vertices as inverted.

\* \* \* \* \*